US012687607B2

(12) United States Patent
Li et al.

(10) Patent No.: US 12,687,607 B2
(45) Date of Patent: Jul. 21, 2026

(54) ASSISTED RADAR CONGESTION MITIGATION

(71) Applicant: QUALCOMM Incorporated, San Diego, CA (US)

(72) Inventors: Qiaoyu Li, Beijing (CN); Hao Xu, Beijing (CN); Jing Dai, Beijing (CN); Chao Wei, Beijing (CN); Yu Zhang, San Diego, CA (US); Min Huang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 682 days.

(21) Appl. No.: 17/999,342

(22) PCT Filed: Jul. 15, 2020

(86) PCT No.: PCT/CN2020/102119
§ 371 (c)(1),
(2) Date: Nov. 18, 2022

(87) PCT Pub. No.: WO2022/011598
PCT Pub. Date: Jan. 20, 2022

(65) Prior Publication Data
US 2023/0184883 A1 Jun. 15, 2023

(51) Int. Cl.
*G01S 7/02* (2006.01)
*G01S 13/00* (2006.01)
*G01S 13/931* (2020.01)

(52) U.S. Cl.
CPC ............ *G01S 7/023* (2013.01); *G01S 13/003* (2013.01); *G01S 13/931* (2013.01); *G01S 2013/9316* (2020.01)

(58) Field of Classification Search
CPC .................. G01S 7/023; G01S 13/003; G01S 2013/9361; G01S 13/931
See application file for complete search history.

(56) References Cited

U.S. PATENT DOCUMENTS 8,817,927 B2 * 8/2014 Zai ........................ G01S 7/0232
375/349
9,084,190 B2 * 7/2015 Noh .................... H04W 56/001
(Continued)

FOREIGN PATENT DOCUMENTS

CN 101398479 A 4/2009
CN 102662161 A 9/2012
(Continued)

OTHER PUBLICATIONS

International Search Report and Written Opinion—PCT/CN2020/ 102119—ISA/EPO—Apr. 22, 2021.
(Continued)

*Primary Examiner* — Marcus E Windrich
(74) *Attorney, Agent, or Firm* — Dinsmore & Shohl LLP—Qualcomm

(57) ABSTRACT

Embodiments include methods for managing operation of a first radar system executed by a processor of a first user equipment (UE) of a first vehicle having the first radar system. In various embodiments, a processor of a first UE of the first vehicle may receive at the first UE from a base station, a wireless communication control message including radar transmission configuration information or radar reception interference information regarding the radar signals from a second radar system of a second vehicle having a second UE. Some embodiments may use the radar transmission configuration information or radar reception interference information received from the base station to manage operation of the first radar system.

26 Claims, 12 Drawing Sheets

(56) References Cited

U.S. PATENT DOCUMENTS

| | | | | |
|---|---|---|---|---|
| 2007/0200747 A1* | 8/2007 | Okai | G01S 7/0235 | |
| | | | 342/159 | |
| 2011/0291875 A1* | 12/2011 | Szajnowski | G01S 13/34 | |
| | | | 342/70 | |
| 2012/0323474 A1* | 12/2012 | Breed | G08G 1/161 | |
| | | | 701/117 | |
| 2013/0165134 A1* | 6/2013 | Touag | H04W 16/14 | |
| | | | 455/452.1 | |
| 2016/0061935 A1* | 3/2016 | McCloskey | G01S 13/931 | |
| | | | 342/82 | |
| 2018/0084555 A1 | 3/2018 | Mori et al. | | |
| 2019/0293748 A1 | 9/2019 | Gulati et al. | | |
| 2020/0107249 A1 | 4/2020 | Stauffer et al. | | |
| 2021/0105633 A1* | 4/2021 | Vaidya | H04W 76/27 | |
| 2021/0195435 A1* | 6/2021 | Rimini | H04W 16/28 | |

FOREIGN PATENT DOCUMENTS

| | | | |
|---|---|---|---|
| CN | 107430184 A | 12/2017 |
| JP | 2010048716 A | 3/2010 |
| TW | 201940894 A | 10/2019 |
| WO | 2020018203 A1 | 1/2020 |

OTHER PUBLICATIONS

Supplementary Partial European Search Report—EP20945523—Search Authority—Munich—Feb. 29, 2024 14 pages.
Supplementary European Search Report—EP20945523—Search Authority—Munich—May 21, 2024. 13 pages.

* cited by examiner

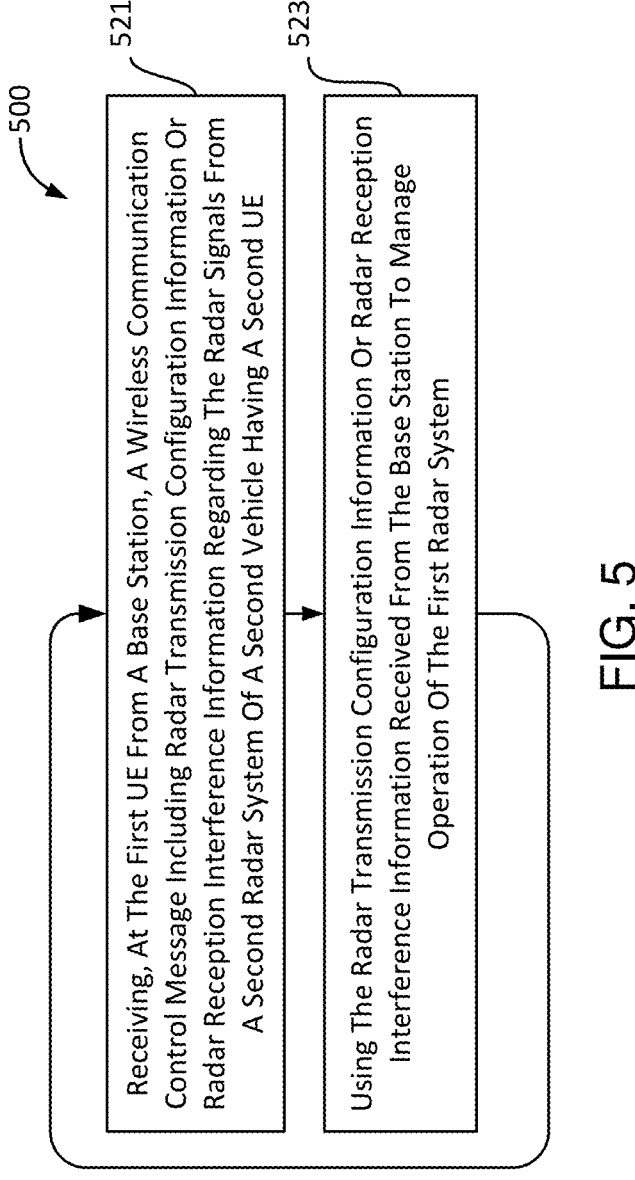

500

Receiving, At The First UE From A Base Station, A Wireless Communication Control Message Including Radar Transmission Configuration Information Or Radar Reception Interference Information Regarding The Radar Signals From A Second Radar System Of A Second Vehicle Having A Second UE

521

Using The Radar Transmission Configuration Information Or Radar Reception Interference Information Received From The Base Station To Manage Operation Of The First Radar System

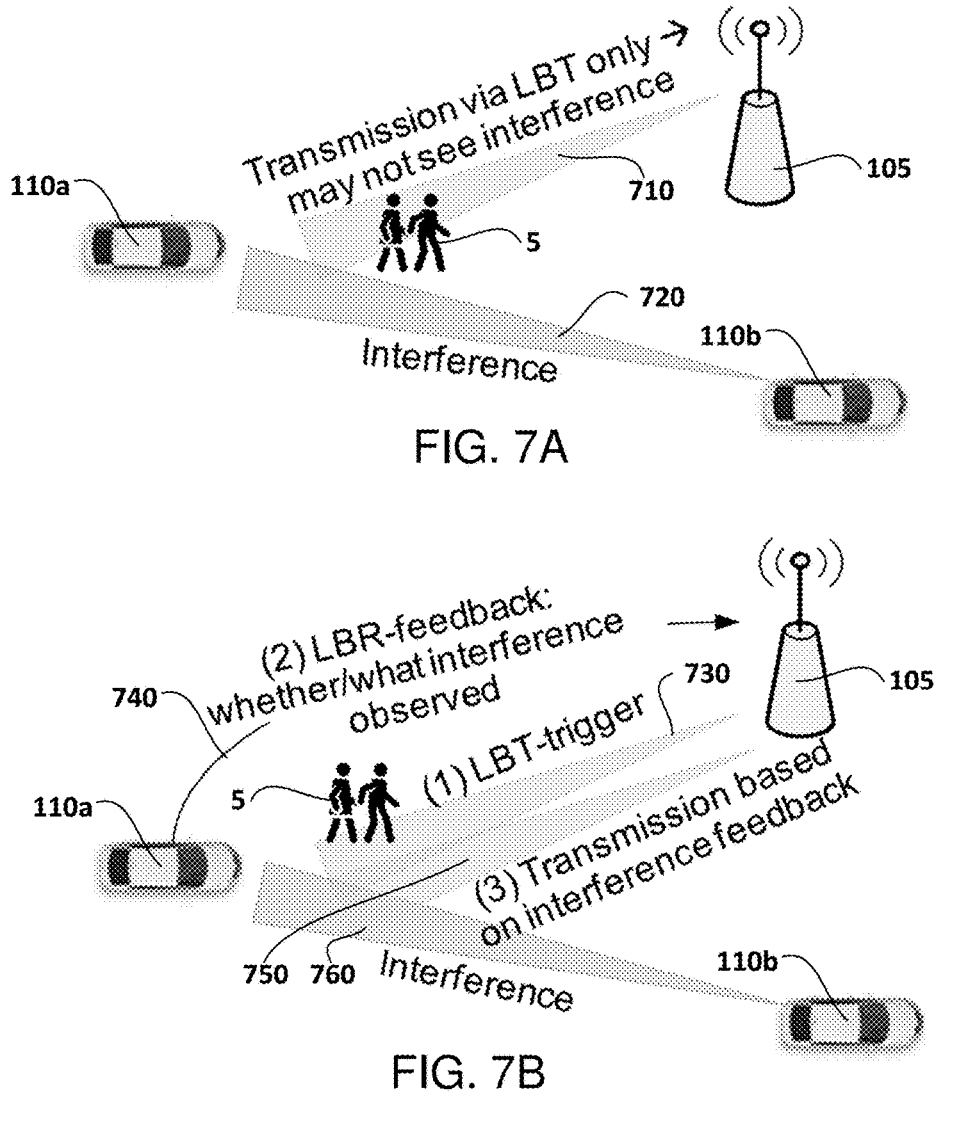
FIG. 7A
FIG. 7B
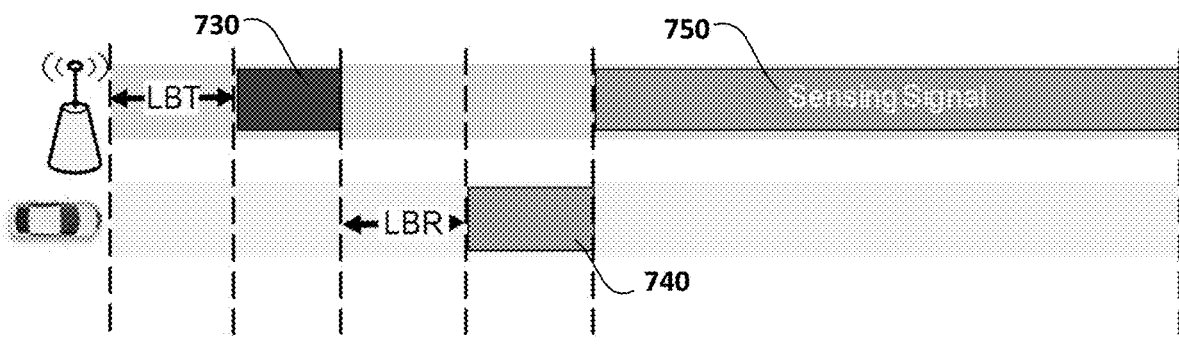
FIG. 7C

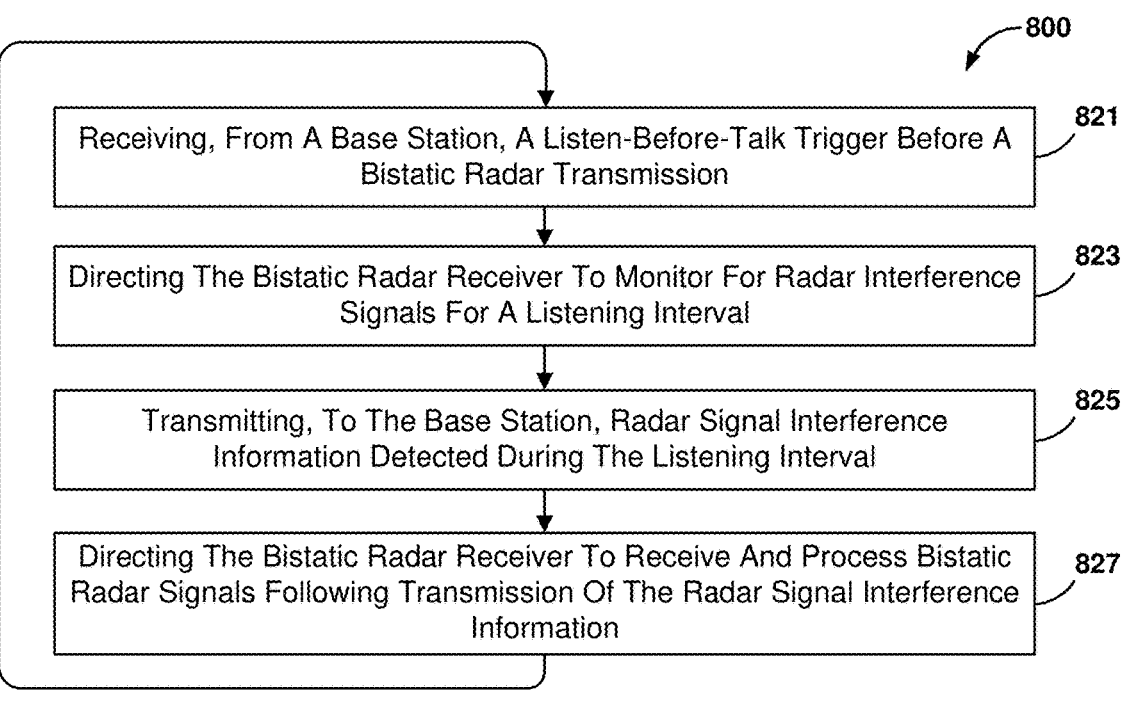

800

Receiving, From A Base Station, A Listen-Before-Talk Trigger Before A Bistatic Radar Transmission — 821

Directing The Bistatic Radar Receiver To Monitor For Radar Interference Signals For A Listening Interval — 823

Transmitting, To The Base Station, Radar Signal Interference Information Detected During The Listening Interval — 825

Directing The Bistatic Radar Receiver To Receive And Process Bistatic Radar Signals Following Transmission Of The Radar Signal Interference Information — 827

FIG. 8A

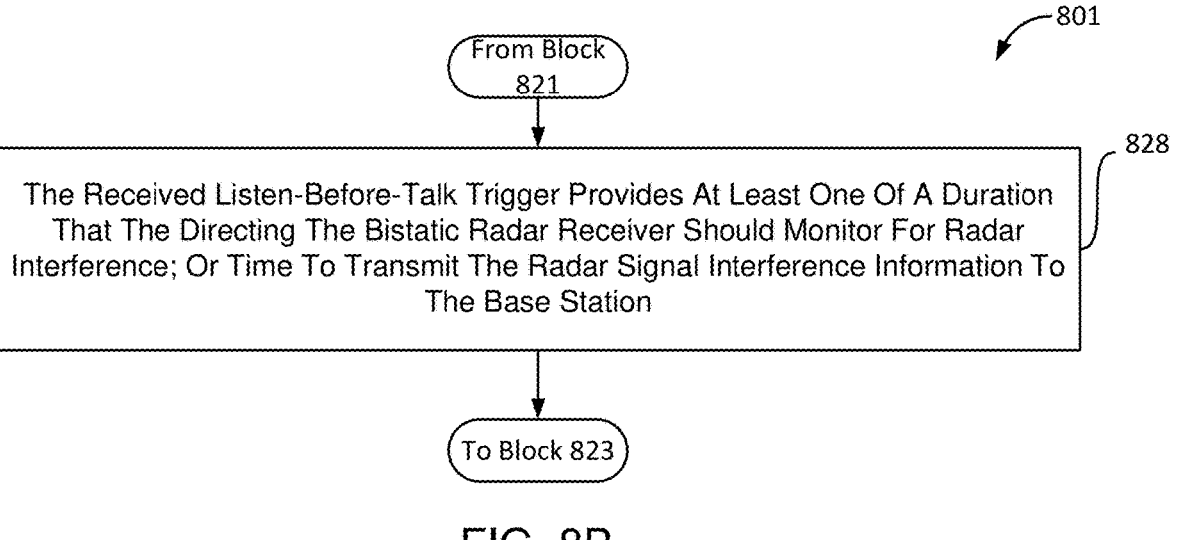

801

From Block 821

The Received Listen-Before-Talk Trigger Provides At Least One Of A Duration That The Directing The Bistatic Radar Receiver Should Monitor For Radar Interference; Or Time To Transmit The Radar Signal Interference Information To The Base Station — 828

To Block 823

FIG. 8B

ASSISTED RADAR CONGESTION MITIGATION

CROSS-REFERENCE TO RELATED APPLICATIONS

This Patent Application is a 371 National Stage of PCT Application No. PCT/CN2020/102119, filed on Jul. 15, 2020, and assigned to the assignee hereof. The disclosure of the prior Application is considered part of and is incorporated by reference into this Patent Application.

BACKGROUND

Vehicles that use and/or include user equipment (UE) that use radar for navigation assistance and/or control, like motor vehicles, often encounter other UEs that also use radar. With both vehicles emitting radar signals, each vehicle may see a reflection of its own signals, plus the radar beams transmitted by the other vehicle, or side lobes from those directly transmitted beams, which may cause radar interference. Conventional systems employ counter-measures to reduce and/or avoid this type of radar interference. While such counter-measures often help reduce interference, they do not fully avoid the interference and are often ineffective.

SUMMARY

Various aspects include methods, user equipment, and computing devices implementing the methods for communicating information for managing operation of a first radar system executed by a processor of a first UE of a first vehicle. Various aspects may include a processor of the first UE receiving from a base station, a wireless communication control message including radar transmission configuration information or radar reception interference information regarding radar signals from a second radar system of a second vehicle having a second UE, and using the radar transmission configuration information or radar reception interference information received from the base station to manage operation of the first radar system.

In some aspects the wireless communication control message may include one of a radio resource control (RRC) message, a medium access control-control element (MAC-CE), a downlink control information (DCI), or a sidelink control information (SCI). In some aspects the DCI or SCI may be carried by one of a physical downlink control channel (PDCCH), a physical downlink shared channel (PDSCH), a physical sidelink control channel (PSCCH), or a physical sidelink shared channel (PSSCH).

In some aspects, the wireless communication control message may include radar transmission configuration information including a modified radar transmission configuration for use in operating the first radar system to avoid interference with the radar signals from the second radar system of the second vehicle. In some aspects, the wireless communication control message may include radar transmission configuration information for use in operating the first radar system including at least one of: time or frequency resource; waveform, duty-cycle, or starting-point; transmission power; space, time, or frequency pre-coding information; or beam sweeping pattern.

In some aspects, the wireless communication control message may include an indication that the first vehicle should immediately terminate radar transmissions.

In some aspects, the wireless communication control message may be one of a DCI or SCI that includes radar transmission configuration information for use in managing radar transmissions by a first radar system comprising to minimize interference with multiple radar components. The multiple radar components may be at least one of mounted on different locations on the second vehicle of a radar component of the second radar system, transmitting with different polarization types, transmitting with different waveforms used for radar transmissions by the radar component of the second radar system, or transmitting with different supported levels of maximum transmission power of the radar component of the second radar system.

In some aspects, the wireless communication control message may be communicated by multiple sets of RRC-configurations or MAC-CE messages or DCI or SCI, including at least one of: different sets of DCI or SCI are distinguished with different synchronization signals (SS), radio network temporary identifiers, or other control information formats, wherein each of the formats corresponds to different radar components of the second radar system, different sets of DCI or SCI are carried by a different one of a physical downlink control channel (PDCCH), a physical downlink shared channel (PDSCH), a physical sidelink control channel (PSCCH), or a physical sidelink shared channel (PSSCH), or different sets of DCI or SCI specify semi-persistent radar signal transmission parameters for the first radar system of the first vehicle to use until a next set of DCI or SCI is received.

In some aspects, the multiple set of RRC configurations or MAC-CE messages or DCI or SCI are respectively associated with different radar components of the first radar system, including mounted on different locations of the second vehicle of a radar component, transmitting with different polarization types, transmitting different waveforms used for radar transmissions by the radar component of the second radar system or transmitting at different transmit power levels.

In some aspects, the wireless communication control message is one of a DCI or an SCI that includes radar reception interference information for use in processing signals received by the first radar system corresponding to more than one radar component of the second radar system comprising at least one of different mounting locations on the second vehicle of a radar component of the second radar system, different polarization types of the radar component of the second radar system, different waveforms used for radar transmissions by the radar component of the second radar system, or different supported levels of maximum transmission power of the radar component of the second radar system.

In some aspects, the wireless communication control message may be a DCI or SCI, and using the radar transmission configuration information or radar reception interference information received from the base station to manage operation of the first radar system may comprise suspending radar transmissions in response to not receiving a DCI or SCI until a next DCI or SCI is received.

In some aspects, the wireless communication control message may include radar transmission configuration information that is part of a group common downlink control information (GC-DCI) to a group of UEs in a group of vehicles that includes the first UE A field within the GC-DCI may correspond to a particular UE within the group of UEs and identifies radar signal transmission parameters to use for managing a radar system of a corresponding vehicle within the group of vehicles. The GC-DCI may include a common field that identifies radar signal transmission parameters to use for managing all radar systems in the group of vehicles.

In some aspects, the wireless communication control message may include radar reception interference information including radar reception parameters configured to enable a radar coupled to the first UE to mitigate radar reception interference from radar signals from the second radar system of the second vehicle, including at least one of a location of the second vehicle or radar signal parameters of the second radar system.

Further aspects may include a computing device functioning as a UE or a base station including a processor configured with processor-executable instructions to perform operations of any of the methods summarized above. Further aspects include a non-transitory processor-readable storage medium having stored thereon processor-executable software instructions configured to cause a processor of a UE to perform operations of any of the methods summarized above. Further aspects include a processing device for use in a UE of a vehicle having a radar system and configured to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIG. 5 is a process flow diagram of a method for vehicle radar interference management executed by a processor of a UE according to various embodiments.

FIGS. 7A and 7B are schematic diagrams illustrating example transportation control systems using bistatic radar suitable for implementing any of some embodiments.

FIG. 7C is a timing diagram illustrating example timing of communication signals and bistatic radar signals according to some embodiments.

FIGS. 8A and/or 8B are process flow diagrams of example methods for vehicle radar interference management using bistatic radar transmissions executed by a processor of a computing device according to various embodiments.

DETAILED DESCRIPTION

Figure 1A:
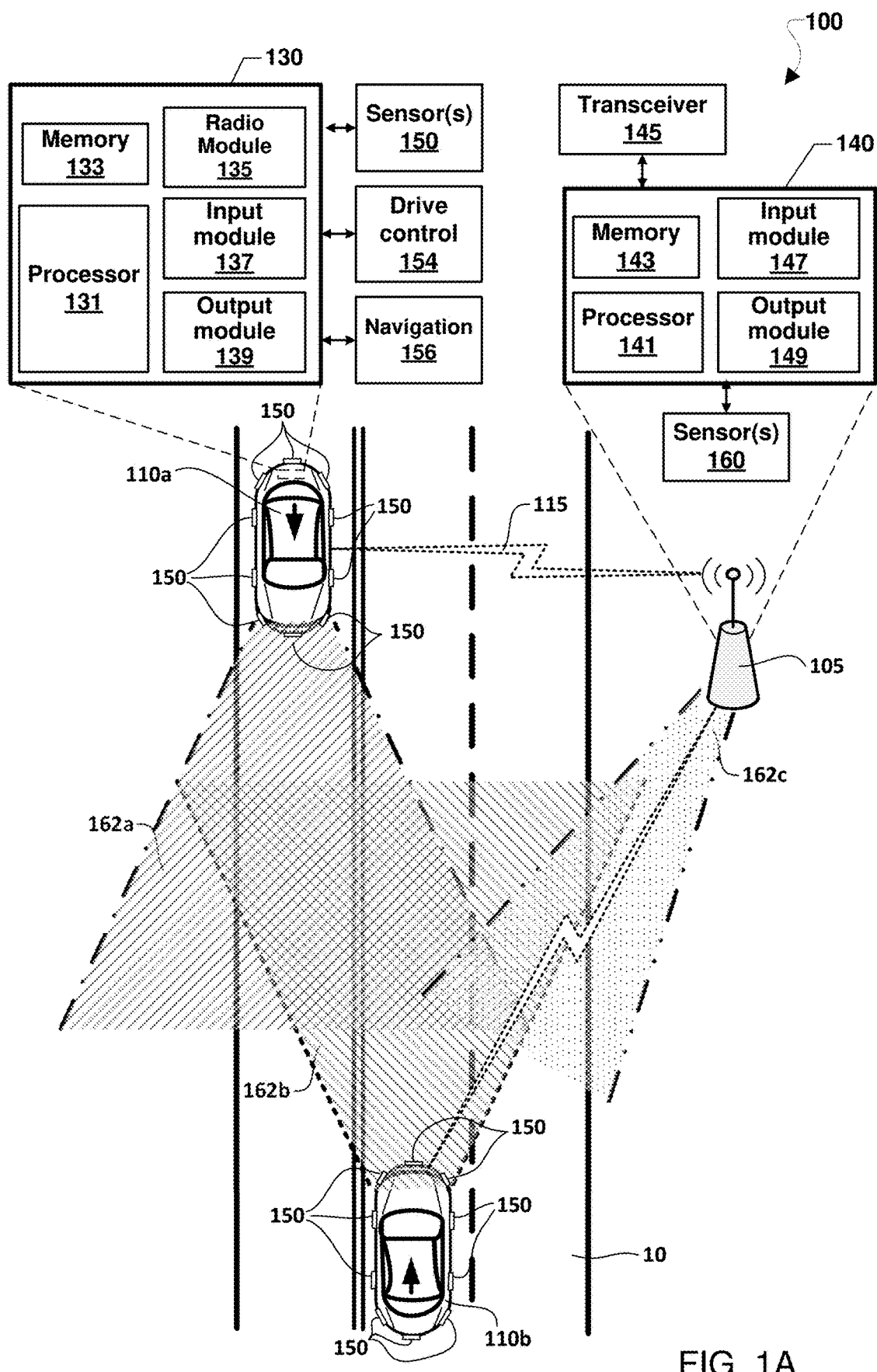
FIGS. 1A and 1B are schematic diagrams illustrating example transportation control systems suitable for implementing any of various embodiments.

Various embodiments will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Various embodiments provide methods and systems that enable vehicle radar system to avoid and/or tune out the radar signals emitted by one or more other vehicles, which may mitigate and/or decrease inter-vehicle radar interference. A base station may transmit radar signal configuration information to the UE of a vehicle using a control message, which may be carried over any of various control channels in a wireless communication system. Control message signaling of such information enable lower latency for communicating such information than sending the information in a data message. Various forms of radar signal configuration information and/or radar interference mitigation information may be transmitted to vehicle UEs, enabling vehicles to reduce the incidence of interference and/or mitigate through processing the radar interference that does occur.

The surface transportation industry has increasingly looked to leverage the growing capabilities of cellular and wireless communication technologies through the adoption of Intelligent Transportation Systems (ITS) technologies to increase intercommunication and safety for both driver-operated vehicles and autonomous vehicles. Vehicle-to-everything (V2X) protocols (including vehicle-to-vehicle (V2V), vehicle-to-infrastructure (V2I), vehicle-to-network communications (V2N), and vehicle-to-pedestrian (V2P) protocols), and particularly the cellular V2X (C-V2X) protocol defined by the 3rd Generation Partnership Project (3GPP) and the 5G new radio (NR) based C-V2X (NR-V2X), support(s) ITS technologies and serves as the foundation for vehicles to communicate directly with the communication devices around them.

C-V2X and NR-V2X define two transmission modes that, together, provide a 360° non-line-of-sight awareness and a higher level of predictability for enhanced road safety and autonomous driving. A first transmission mode includes direct V2X, which includes V2V, V2I, and V2P, and that provides enhanced communication range and reliability in the dedicated ITS 5.9 gigahertz (GHz) spectrum that is independent of a cellular network. A second transmission mode includes V2N communications in mobile broadband systems and technologies, such as third generation wireless mobile communication technologies (3G) (e.g., global system for mobile communications (GSM) evolution (EDGE) systems, code division multiple access (CDMA) 1350 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G) (e.g., 5G New Radio (5G NR) systems, etc.), etc.

As used herein, the term "vehicle" refers to refers to one of various types of autonomous or semi-autonomous vehicles (e.g., land vehicles, including automobiles, trucks, buses, etc.), aircraft, waterborne vehicles, or a combination thereof) that may operate without onboard human pilots/ drivers. A vehicle may include an onboard computing device configured to operate and/or fly the vehicle without remote operating instructions (i.e., autonomously), such as from a human operator or remote computing device. Alternatively or additionally, the computing device onboard the vehicle may be configured to receive radar operating instructions and/or updates to instructions from a base station via communications in accordance with various embodiments.

As used herein, the term "user equipment" refers an electronic device equipped with at least a processor, communication systems, and memory (i.e., electronic storage) within or built into a vehicle for communicating with a wireless communication network. The user equipment may be equipped with a mobile broadband adapter, and/or any similar device(s) configured to connect to a base station (e.g., Node B/eNodeB), as specified in 3GPP specifications, European Telecommunications Standards Institute (ETSI) specifications, or other similar specifications.

As used herein, the term "base station" refers to an entity that communicates with wireless devices (e.g., UEs), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The base station may provide a connection between communicating vehicles and/or communicate directly with one or more vehicles. The base station may operate as a hub for communications to and/or from one or more vehicles. A base station may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station may support one or multiple (for example, three) cells. The terms "eNB", "base station", "NR BS", "gNB", "TRP", "AP", "node B", "5G NB", and "cell" may be used interchangeably herein.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Various embodiments may be implemented within a variety of transportation control systems, an example of which is illustrated in FIG. 1A as transportation control system 100. With reference to FIG. 1A, the transportation control system 100 may include at least one base station 105 configured to communicate with vehicles, such as the first and second vehicles 110*a*, 110*b* traveling on a roadway 11. In addition, one or both of the first and second vehicles 110*a*, 110*b* may be configured to use a radar system for measuring distances, navigation, proximity alerts, and other vehicular functions. Traditionally, the radar system from one vehicle (e.g., the first vehicle 110*a*) tends to interfere with the radar system from the other vehicle (e.g., the second vehicle 110*b*), but various embodiments provide a system for vehicles (e.g., 110*a*) to avoid and/or tune out the radar signals emitted by another vehicle (e.g., 110*b*) and/or a plurality of other vehicles.

The base station 105 may include a control unit 140, which may include various circuits and devices used to control operations thereof. In the example illustrated in FIG. 1A, the control unit 140 includes a processor 141, memory 143, an input module 147, and an output module 149. In addition, the control unit 140 may be coupled to a transceiver 145 for transmitting and/or receiving wireless communications and one or more sensors 160.

Each of the first and second vehicles 110*a*, 110*b* may include user equipment (UE) 130, which may include various circuits and devices used to control operations thereof. In the example illustrated in FIG. 1A, the UE 130 includes a processor 131, memory 133, a radio module 135, an input module 137, and an output module 139. In addition, the UE 130 may be coupled to and configured to control drive control components 154, navigation components 156, and one or more sensors 150 (e.g., a radar system) of the vehicle 110*a*.

FIG. 1A illustrates the first vehicle 110a coordinating with the base station 105 to reduce radar interference that the first vehicle 110a may otherwise encounter from the radar emissions 162b of the second vehicle 110b. A first radar system 150 of the first vehicle 110 may emit radar signals 162a and process received reflected signals to identify objects in the path of the vehicle. However, other vehicles, such as the second vehicle 110b are also emitting radar signals 162b, which could interfere with the ability first radar system 150 to detect and localize objects. In order to reduce such radar interference, the processor 141 of the base station 105 may determine radar transmission configuration information or radar reception interference information useful by a first radar system of the first vehicle 110a. Using the transceiver 145, the processor 141 of the base station 105 may then transmit, to the UE 130 of the first vehicle 110a, a wireless communication control message through wireless signals 115, including the determined radar transmission configuration information or radar reception interference information. The UE 130 of the first vehicle 110a may receive the wireless communication control message including radar transmission configuration information or radar reception interference information regarding the radar signals 162b from a second radar system of the second vehicle 110b. The processor 131 of the first vehicle 110a may then use the radar transmission configuration information or radar reception interference information received from the base station 105 to manage operation of the first radar system.

The radio module 135 and/or the transceiver 145 may be configured for wireless communication by exchanging signals in a wireless communication link 115 (e.g., command signals for controlling maneuvering, messages for optimizing radar systems, signals from navigation facilities, etc.) with the base station 105 and/or other network transceivers. The wireless communication link 115 may include a plurality of carrier signals, frequencies, or frequency bands, each of which may include a plurality of logical channels. Also, the wireless communication link 115 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 115 within the communication system may include medium range protocols such as Wi-Fi, LTE-U, LTE-Direct, LAA, MuLTEfire, and relatively short range RATs such as ZigBee, Bluetooth, and Bluetooth Low Energy (LE).

While descriptions of some embodiments may use terminology and examples associated with LTE technologies, various embodiments may be applicable to other wireless communications systems, such as a new radio (NR) or 5G network. NR may utilize orthogonal frequency-division multiplexing (OFDM) with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

The radio module 135 and/or the transceiver 145 may provide the wireless communication link 115 to the processors 131, 141, respectively, and/or other components thereof. In some embodiments, the wireless communication link 115 may be a bidirectional or unidirectional communication link, and may use one or more communication protocols. In some embodiments, the radio module 135 may enable the vehicle 110a to communicate with another vehicle 110b through another wireless communication link, which may also be a bidirectional or unidirectional communication link, and may use one or more communication protocols.

The input modules 137 may receive sensor data from one or more vehicle sensors 150 (e.g., a radar system) as well as electronic signals from other components, including the drive control components 154 and the navigation components 156. Similarly, the input modules 147 may receive sensor data from one or more station sensors 160 (e.g., a radar system) as well as electronic signals from other components. Sensors 150, 160 may detect the presence, direction, distance, and/or speed of other vehicles, individuals, and/or objects, by sending out pulses (e.g., radar signals 162a, 162b, 162c) of high-frequency electromagnetic waves that are reflected off the object back to the source.

The output modules 139, 149 may be used to communicate with or activate various components of the vehicle 110a and/or base station 105, including the transceiver 145, the drive control components 154, the navigation components 156, and the sensor(s) 150, 160.

The UE 130 may be coupled to the drive control components 154 to control physical elements of the vehicle 110a related to maneuvering and navigation of the vehicle, such as the engine, motors, throttles, directing elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The UE 130 may be coupled to the navigation components 156, and may receive data from the navigation components 156 and be configured to use such data to determine the present position and orientation of the vehicle 110*a*, as well as an appropriate course toward a destination. In various embodiments, the navigation components 156 may include or be coupled to a global navigation satellite system (GNSS) receiver system (e.g., one or more Global Positioning System (GPS) receivers) enabling the vehicle 110*a* to determine its current position using GNSS signals. Alternatively, or in addition, the navigation components 156 may include radio navigation receivers for receiving navigation beacons or other signals from radio nodes (e.g., the base station 105), such as Wi-Fi access points, cellular network sites, radio stations, remote computing devices, other vehicles, etc. Through control of the drive control components 154, the processor 131 may control the vehicle 110*a* to navigate and maneuver. The processor 131 and/or the navigation components 156 may be configured to communicate with a remote computing device (e.g., a server) on a network (e.g., the Internet) using wireless communication links to receive commands to control maneuvering, receive data useful in navigation, provide real-time position reports, and assess other data.

While the UE 130 is described as including separate components, in some embodiments some or all of the components (e.g., the processor 131, the memory 133, the radio module 135, the input module 137, and/or the output module 139) may be integrated in a single device or module, such as a system-on-chip (SOC) processing device. Such an SOC processing device may be configured for use in vehicles and be configured, such as with processor-executable instructions executing in the processor 131, to perform operations of various embodiments.

In various embodiments, the control unit 140 of the base station 105 and the UE 130 of the vehicle 110*a* may exchange radar-available vehicle information using vehicle-to-everything (V2X) communications. The radar-available vehicle information may include:

Location/speed/driving-direction/lane-index;

Each radar system's transmission-direction/polarity/power, reception-sensitivity/polarity/post-processing-capabilities;

Each radar system's supported waveform(s), and related parameters (e.g., duty-cycle, Frequency-range, and/or chirp types); and/or Radar space-time-frequency pre-coding capabilities.

V2X is a technology that allows vehicles to communicate with moving parts of the traffic system around them. Providing radar-available vehicle information to other vehicles may help those vehicles avoid interference, using different waveforms, duty cycles, frequency ranges, chirp types, timing, and other techniques. In this way, the other vehicles may employ more effective counter-measures.

Various embodiments relate to how the UE 130 may transmit and/or indicate to other vehicles a radar signal configuration for the other vehicles to avoid and/or better mitigate interference. In particular, the UE 130 may be configured to transmit radar signal information that includes one or more parameters, including:

Time/frequency resource;

Waveform, duty-cycle, and starting-point;

Transmission power;

Space/time/frequency pre-coding information;

Beam sweeping pattern (e.g., clock-wise/counter-clockwise/selected-beams); and/or An indication to immediately terminate transmissions.

In addition, various embodiments may be configured to separately transmit the above-noted radar signal information by different RRC, MAC-CE, DCI, or SCI for different components. For example:

Different radar sensors mounted on different sides (left/right/front/rear/top/bottom) of the vehicle 110*a*, 110*b*.

Different polarization types.

Different waveforms (pulse/FMCW/PMCW) used/supported by the Radar.

This may further depend on supported duty-cycle and starting point.

For pulse, may further depend on duty-cycle & inter-pulse-interval.

For FMCW, may further depend on different chirp types (Up/Down).

Different supported levels of maximum transmission power.

Further, various embodiments may be configured to transmit the above-noted radar signal information based on more than one set of DCI or SCI. The DCI is transmitted by a base station to a UE and may be used to schedule the downlink/uplink data transmission and convey essential configurations. Different DCI formats may correspond to the different transmission modes. In contrast, the SCI may carry the information required by the receiving UE in order to receive and demodulate transmissions on a physical sidelink control channel (PSCCH).

The different sets of DCI/SCI may further include:

Different DCIs/SCIs identified by different synchronization signals (SS), radio network temporary identifiers, or other control information formats, wherein each of the formats corresponds to different radar components of the second radar system, which may be associated with different components discussed above;

The DCI/SCI can be carried by PDCCH/PDSCH/PSCCH/PSSCH;

The DCI/SCI may specify Radar signal transmission parameters until detecting a next DCI/SCI; and The PxCCH/PxSCH to detect such DCI/SCI may be semi-persistent scheduling (SPS) configured, plus if the UE does not receive such a DCI/SCI, Radar signal transmission associated with the DCI/SCI should be refrained until successfully detecting a next DCI/SCI.

Figure 1B:
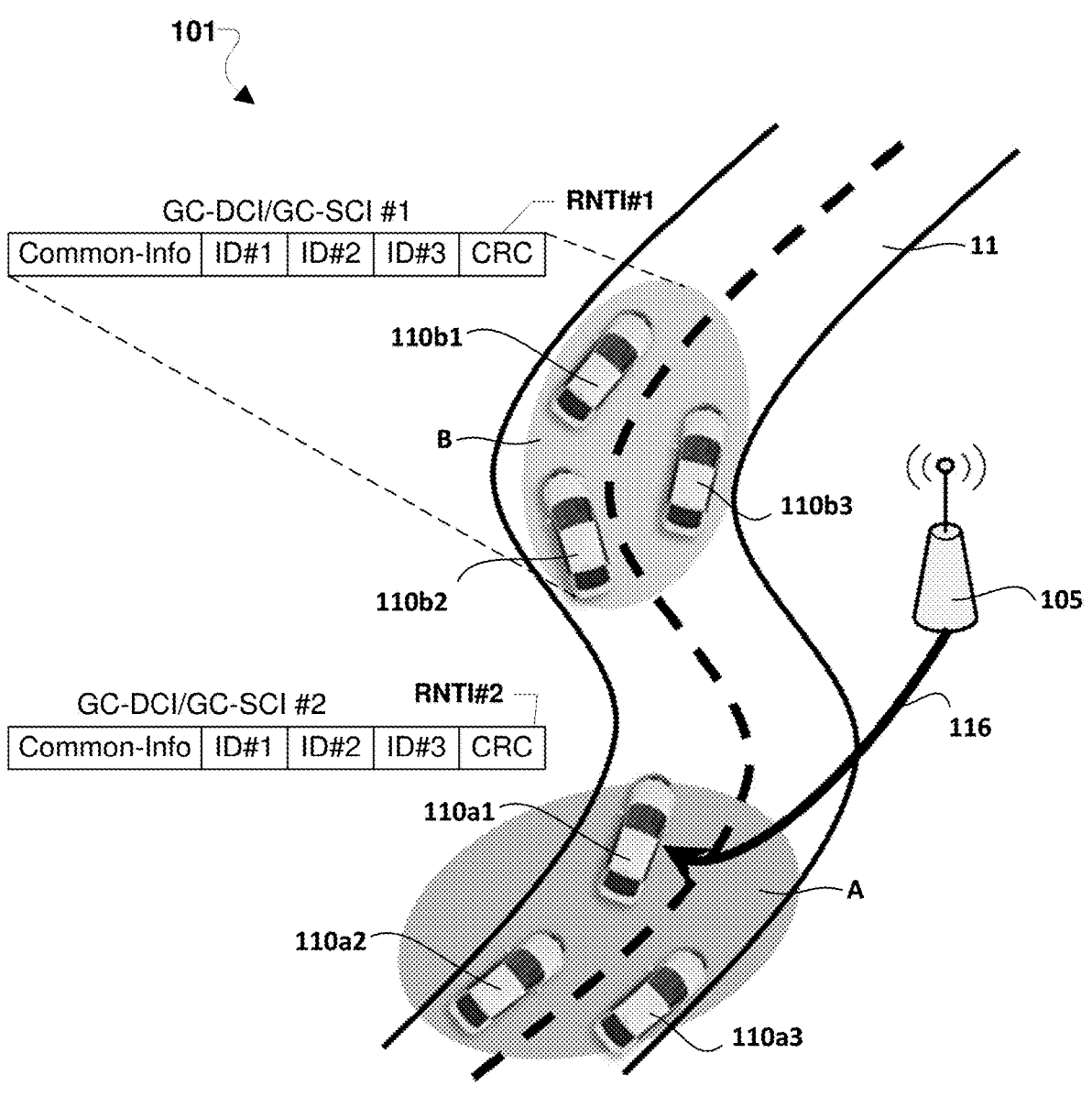

Various embodiments may be implemented within a variety of transportation control systems, another example of which is illustrated in FIG. 1B as transportation control system 101. With reference to FIG. 1B a first vehicle 110*a*1 is illustrated as traveling on the roadway 11 in a first platoon A (i.e., part of a group), along with other first platoon vehicles 110*a*2, 110*a*3. In addition, a second platoon B is traveling on the same roadway 11, some distance ahead of the first platoon A.

In some embodiments, the base station 105 may be configured to transmit the above-noted radar signal information based on the DCI/SCI in Group Common (GC) communications (GC-DCI/GC-SCI). For example, different UEs (e.g., 110*a*1, 110*a*2, 110*a*3) may be configured to monitor different fields in a same GC-DCI/GC-SCI to identify their respective radar signal transmission parameters. Thus, the GC-DCI/GC-SCI may include UE-specific fields (e.g., ID #1, ID #2, ID #3), which may indicate starting-point offset, frequency-range, precoding-info, etc. In addition, the GC-DCI/GC-SCI's (e.g., GC-DCI/GC-SCI #1, GC-DCI/GC-SCI #2) may comprise a common-info field indicating common information for all UEs monitoring the group common communications for information (e.g., duty-cycle, waveform, power). Further, the GC-DCI/GC-SCI's may include a radio network temporary indicator field-index (i.e., RNTI/field-index), which the groups A, B may use to identify the GC-xCI's designated for that group.

Various embodiments relate to what radar signal interference information the UE's may transmit and/or indicate to other vehicles, which may help mitigate unavoidable radar signal interference. A UE may be configured to transmit radar signal information that includes one or more parameters for improving radar signal reception. Such parameters may include:

Interferer vehicle/Radar's physical info, such as:
 location (e.g., GPS-info/grid-index),
 Interferer Radar's position on the vehicle (e.g., left/right/front/rear), and/or
 Polarization of the interferer Radar; and/or
 Interferer Radar signal parameters, including:
 Waveform (pulse/FMCW/PMCW),
 Time-domain: duty-cycle, staring point, pulse/sweeping-duration,
 Frequency-domain: frequency-range, FH-pattern,
 Space-domain: QCL-info/TCI-state, PMI, RS-info, and/or
 Code-domain: code length, or code width.

Various embodiments may use one or more traditional counter-measures for reducing and/or avoiding this type of radar interference. Such counter-measures include:

Constant false alarm rate (CFAR) monitoring for interference mitigation;
 Detect interference and change transmit frequency range of chirps;
 Using pauses of random length between chirps or pulses;
 Application of driving direction specific pre-defined frequency band separation;
 Detect interference and repair reception (Rx) results (time domain);
 Using random sequence of chirp types (up-chirp, down-chirp, CW-chirp);
 Digital beam forming;
 Detect interference and change timing of transmit chirp or pulses; and/or
 Specific polarization following the radar location (frontal, rear, side).

Figure 2:
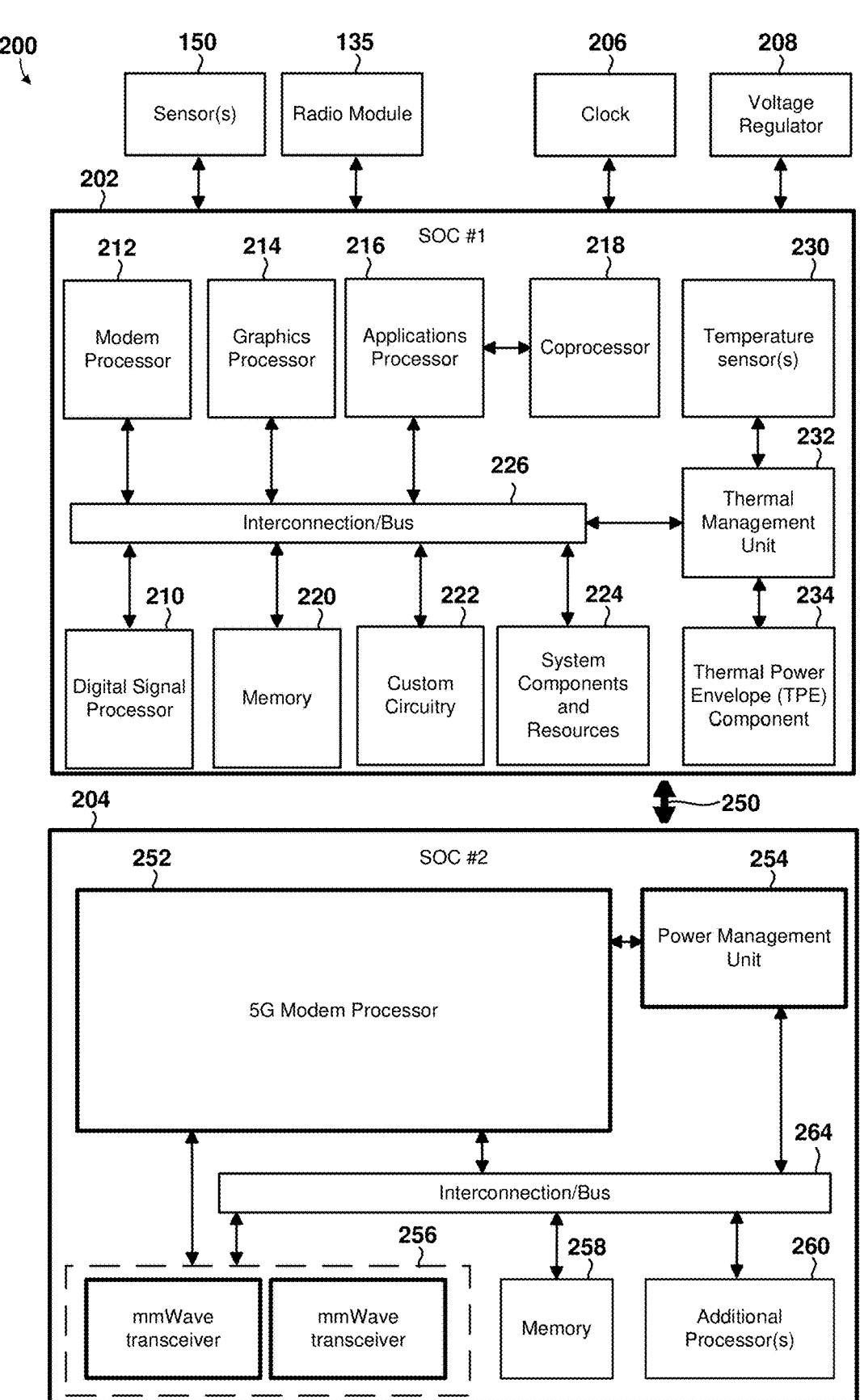
FIG. 2 is a component block diagram illustrating an example system in package suitable for implementing any of the various embodiments.

FIG. 2 is a component block diagram illustrating an example UE 130 suitable for implementing any of the various embodiments. Various embodiments may be implemented on a number of single processor and multiprocessor computer systems, including a system-on-chip (SOC) or system in a package (SIP).

With reference to FIGS. 1A-2, the illustrated example SIP 200 includes a two SOCs 202, 204 coupled to a clock 206, a voltage regulator 208 and a radio module 135. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as the radio module 135, sensor(s) 150, a clock 206 and a voltage regulator 208. Resources external to the SOC (e.g., clock 206, voltage regulator 208) may be shared by two or more of the internal SOC processors/cores.

In addition to the example UE 130 discussed above, various embodiments may be implemented in a wide variety of computing systems, which may include a single processor, multiple processors, multicore processors, or any combination thereof.

Figure 3:
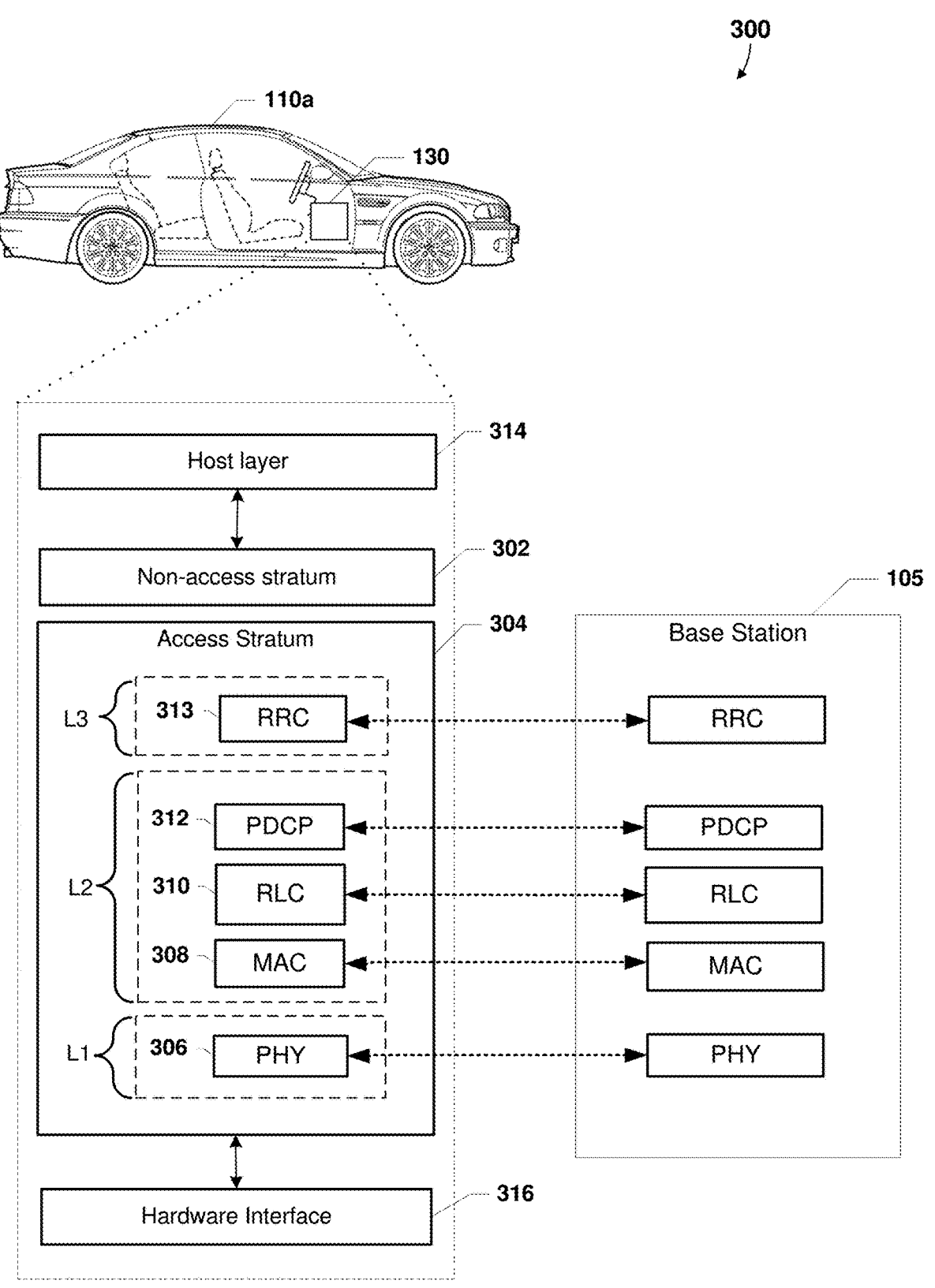
FIG. 3 is a component block diagram illustrating a software architecture including a radio protocol stack for the user equipment and base station in wireless communications suitable for implementing any of the various embodiments.

FIG. 3 is a software architecture diagram illustrating a software architecture 300 including a radio protocol stack for the user and control planes in wireless communications suitable for implementing any of the various embodiments. With reference to FIGS. 1A-3, the UE 130 may implement the software architecture 300 to facilitate communications between the UE 130 and a base station 105 of a transportation control system (e.g., 100). In various embodiments, layers in the software architecture 300 may form logical connections with corresponding layers in software of the base station 105. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the UE 130 (e.g., SIM(s) 204) and its vehicle. The AS 304 may include functions and protocols that support communications between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including a PDCCH and a PDSCH, or sidelink channels such as a PSCCH and a PSSCH.

In the user and control planes, Layer 2 (L2) of the AS 304 may be responsible for the link between the UE 130 and the base station 105 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 105.

In the control plane, Layer 3 (L3) of the AS 304 may include an RRC sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the UE 130 and the base station 105.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE 130. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
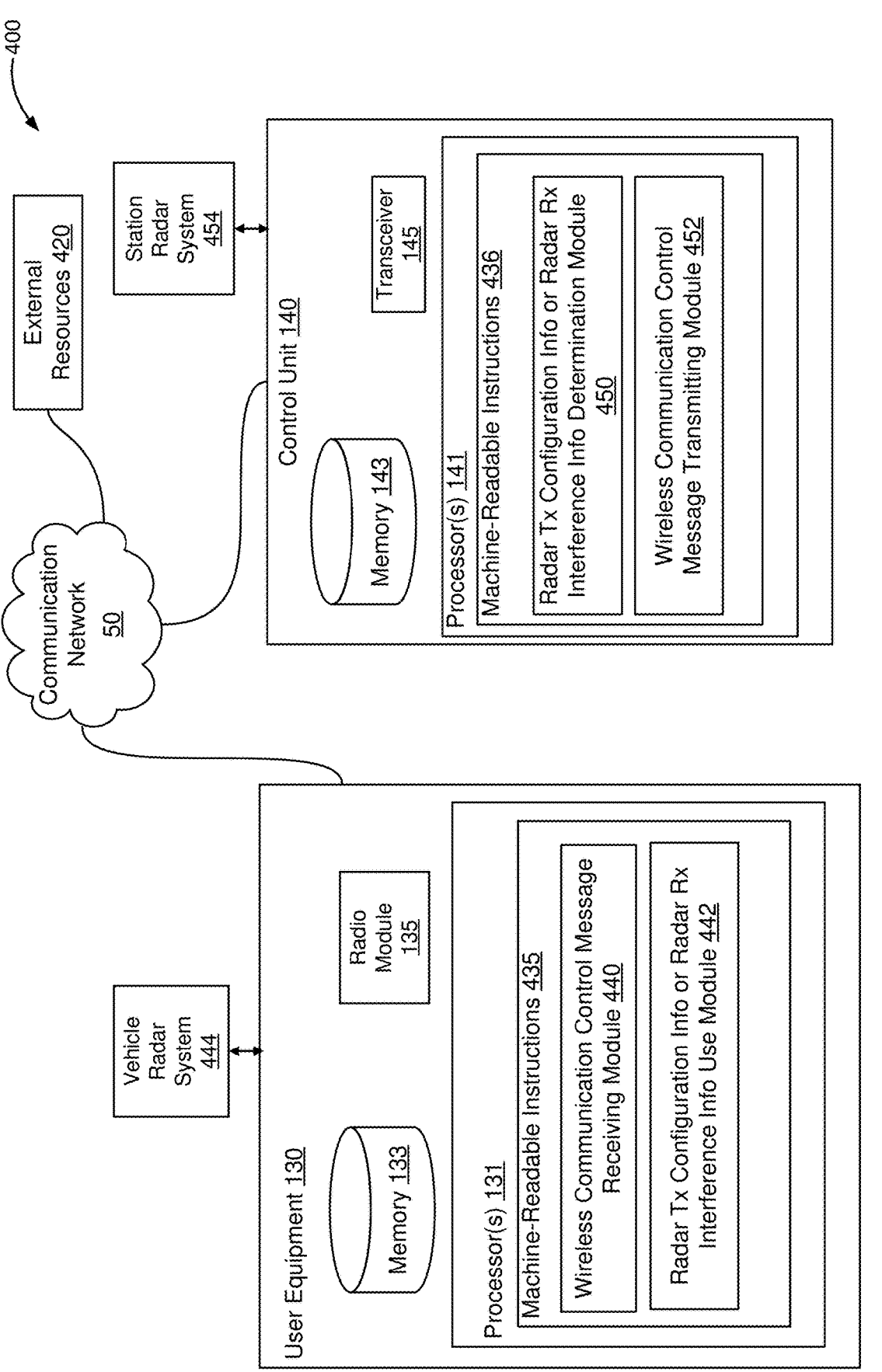
FIG. 4 is a component block diagram illustrating a system configured for radar interference management in accordance with various embodiments.

FIG. 4 is a component block diagram illustrating a system 400 configured for radar interference management in accordance with various embodiments. In some embodiments, the system 400 may include the UE 130 and/or the one or more base station control unit 140. The system 300 may also include base station control unit 140, which may be part of a traffic management system configured to help the UE 130 improve radar interference mitigation and/or avoidance.

The UE 130 may also include memory 133 (i.e., electronic storage), one or more processors 131, and/or other components such as a radar system 444. The UE 130 may also include communication lines or ports, such as the radio module 135 to enable the exchange of information with a network and/or other computing platforms, such as the base station control unit 140. Illustration of the UE 130 in FIG. 1A is not intended to be limiting. The UE 130 may include a plurality of hardware, software, and/or firmware components operating together to provide the functionality attributed herein to the UE 130. For example, the UE 130 may be coupled to a vehicle radar system 444 that is configured to generate radar emissions and receive returning radar signals thereby generated.

The base station control unit 140 may include memory 143 (i.e., electronic storage), one or more processors 141, and/or other components such as a sensor 160. The UE 130 may also include communication lines or ports, such as the transceiver 145 to enable the exchange of information with a network and/or other computing platforms, such as the UE 130. Illustration of the control unit 140 in FIG. 4 is not intended to be limiting. The control unit 140 may include a plurality of hardware, software, and/or firmware components operating together to provide the functionality attributed herein to the base station control unit 140. For example, the control unit 140 may be coupled to a station radar system 454 that is configured to generate radar emissions and receive returning radar signals thereby generated.

External resources 420 include remote servers that may receive radar transmission configuration information or radar reception interference information regarding the radar signals from radar systems of vehicles having UE's, such as in downloads via the communication network 50. External resources 420 may receive radar transmission configuration information or radar reception interference information various vehicle via a plurality of UE's.

Memory 133, 143 may comprise non-transitory computer readable medium that electronically stores information. The electronic storage media of memory 133, 143 may include one or both of system storage that is provided integrally (i.e., substantially non-removable) with the UE 130 or base station control unit 140, respectively, and/or removable storage that is removably connectable thereto. For example, a port (e.g., a Universal Serial Bus (USB) port, a FireWire port, etc.) or a drive (e.g., a disk drive, etc.). Memory 133, 143 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Memory 133, 143 may include one or more virtual storage resources (e.g., cloud storage, a virtual private network, and/or other virtual storage resources). Memory 133, 143 may store software algorithms, information determined by processor(s) 131, 141, information received from the UE 130 or base station control unit 140, respectively, that enables the UE 130 or base station control unit 140, respectively to function as described herein.

Processor(s) 131, 141 may be configured to provide information processing capabilities in the UE 130 or base station control unit 140, respectively. As such, processor(s) 131, 141 may include one or more of a digital processor, an analog processor, a digital circuit designed to process information, an analog circuit designed to process information, a state machine, and/or other mechanisms for electronically processing information. Although processor(s) 131, 141 are each shown in FIG. 4 as a single entity, this is for illustrative purposes only. In some implementations, processor(s) 131, 141 may include a plurality of processing units. These processing units may be physically located within the same device, or processor(s) 131, 141 may represent processing functionality of a plurality of devices, remote and/or local to one another, operating in coordination.

The UE 130 may be configured by machine-readable instructions 435, which may include one or more instruction modules. The instruction modules may include computer program modules. In particular, the instruction modules may include one or more of a wireless communication control message receiving module 440, a radar transmission configuration information or radar reception interference information use module 442 (i.e., Radar Tx Configuration Info or Radar Rx Interference Info Use Module 442), and/or other instruction modules.

The wireless communication control message receiving module 440 may be configured to receive, at the UE 130 from the control unit 140 of a base station, a wireless communication control message including radar transmission configuration information or radar reception interference information regarding the radar signals from a radar system of another vehicle having another UE. The wireless communication control message may include one of a radio resource control (RRC) message, a medium access control-control element (MAC-CE), a downlink control information (DCI), or a sidelink control information (SCI). The DCI or SCI may be carried by one of a physical downlink control channel (PDCCH), a physical downlink shared channel (PDSCH), a physical sidelink control channel (PSCCH), or a physical sidelink shared channel (PSSCH). Also, the wireless communication control message may include radar transmission configuration information comprising a modified radar transmission configuration for use in operating the first radar system to avoid interference with the radar signals from the second radar system of the second vehicle. The wireless communication control message may include radar transmission configuration information for use in operating the first radar system, which may include at least one of:

time or frequency resource, waveform, duty-cycle, or starting-point, transmission power, space, time, or frequency pre-coding information, and/or beam sweeping pattern.

In some embodiments, the wireless communication control message may include an indication that the first vehicle should immediately terminate radar transmissions.

In some embodiments, the wireless communication control message may be one of a DCI or SCI that includes radar transmission configuration information for use in managing radar transmissions by a first radar system comprising to minimize interference with multiple radar components. The multiple radar components may be at least one of:

mounted on different locations on the second vehicle of a radar component of the second radar system, transmitting with different polarization types, transmitting with different waveforms used for radar transmissions by the radar component of the second radar system, and/or transmitting with different supported levels of maximum transmission power of the radar component of the second radar system.

In some embodiments, the wireless communication control message may be communicated by multiple sets of RRC-configurations or MAC-CE messages or DCI or SCI, including at least one of:

different sets of DCI or SCI are distinguished with different synchronization signals (SS), radio network temporary identifiers, or other control information formats, wherein each of the formats corresponds to different radar components of the second radar system, different sets of DCI or SCI are carried by a different one of a physical downlink control channel (PDCCH), a physical downlink shared channel (PDSCH), a physical sidelink control channel (PSCCH), or a physical sidelink shared channel (PSSCH), and/or different sets of DCI or SCI specify semi-persistent radar signal transmission parameters for the first radar system of the first vehicle to use until a next set of DCI or SCI is received.

In some embodiments, the multiple set of RRC configurations or MAC-CE messages or DCI or SCI are respectively associated with different radar components of the first radar system, including:

mounted on different locations of the second vehicle of a radar component;

transmitting with different polarization types;

transmitting different waveforms used for radar transmissions by the radar component of the second radar system; and/or transmitting at different transmit power levels.

In some embodiments, the wireless communication control message is one of a DCI or an SCI that includes radar reception interference information for use in processing signals received by the first radar system corresponding to more than one radar component of the second radar system comprising at least one of:

different mounting locations on the second vehicle of a radar component of the second radar system;

different polarization types of the radar component of the second radar system;

different waveforms used for radar transmissions by the radar component of the second radar system; and/or different supported levels of maximum transmission power of the radar component of the second radar system.

In some embodiments, the wireless communication control message may include radar transmission configuration information that is part of a group common communication to a group of UEs in a group of vehicles that includes the UE 130. A field within the group common communication may correspond to a particular UE within the group of UEs and identify radar signal transmission parameters to use for managing a radar system of a corresponding vehicle within the group of vehicles. Additionally, the group common communication may include a common field that identifies radar signal transmission parameters to use for managing all radar systems in the group of vehicles.

In some embodiments, the wireless communication control message may include radar reception interference information comprising radar reception parameters configured to enable a radar coupled to the UE 130 to mitigate radar reception interference from radar signals from a radar system of another vehicle, including at least one of a location of the other vehicle's UE or radar signal parameters of the other vehicle's UE.

By way of non-limiting example, means for implementing the machine-readable instructions 435 of the wireless communication control message receiving module 440 may include a processor (e.g., 210, 212, 214, 216, 218, 252, 260, 131, 141) of a processing device (e.g., 130, 140) that may use the memory 133, 143, external resources 420, and/or one or more sensor(s) (e.g., vehicle radar system 444).

The radar transmission configuration information or radar reception interference information use module 442 may be configured to use the radar transmission configuration information or radar reception interference information received from the base station control unit 140 to manage operation of the first radar system. The radar transmission configuration information or radar reception interference information use module 442 may use the radar transmission configuration information or radar reception interference information received from the base station control unit 140 to manage operation of the first radar system, such as suspend radar transmissions in response to not receiving a DCI or SCI until a next DCI or SCI is received. For example, the radar transmission configuration information or radar reception interference information use module 442. By way of non-limiting example, means for implementing the machine-readable instruction 435 of the radar transmission configuration information or radar reception interference information module 442 may include a processor (e.g., 210, 212, 214, 216, 218, 252, 260, 131, 141) of a processing device (e.g., 130, 140) may use the memory 133, 143, external resources 420, and/or one or more sensor(s) (e.g., radar system 444).

The base station control unit 140 may be configured by machine-readable instructions 436, which may include one or more instruction modules. The instruction modules may include computer program modules. In particular, the instruction modules may include one or more of a radar transmission configuration information or radar reception interference information determination module 450 (i.e., Radar Tx Configuration Info or Radar Rx Interference Info Determination Module 450), a wireless communication control message transmitting module 452, and/or other instruction modules.

The radar transmission configuration information or radar reception interference information determination module 450 may be configured to determine radar transmission configuration information or radar reception interference information useful by a radar system of a vehicle in which the UE 130 is located or incorporated. In some embodiments, the radar transmission configuration information or radar reception interference information may include one of a radio resource control (RRC) message, a medium access control-control element (MAC-CE), a downlink control information (DCI), or a sidelink control information (SCI). The DCI or SCI may be carried by one of a physical downlink control channel (PDCCH), a physical downlink shared channel (PDSCH), a physical sidelink control channel (PSCCH), or a physical sidelink shared channel (PSSCH). Also, the radar transmission configuration information or radar reception interference information may include radar transmission configuration information comprising a modified radar transmission configuration for use in operating the first radar system to avoid interference with the radar signals from the second radar system of the second vehicle. The radar transmission configuration information or radar reception interference information may include radar transmission configuration information for use in operating the first radar system, which may include at least one of:

time or frequency resource, waveform, duty-cycle, or starting-point, transmission power, space, time, or frequency pre-coding information, and/or beam sweeping pattern.

Alternatively, or additionally, the radar transmission configuration information or radar reception interference information may include an indication that the first vehicle should immediately terminate radar transmissions.

In some embodiments, the radar transmission configuration information or radar reception interference information may be one of a DCI or SCI that includes radar transmission configuration information for use in processing signals received by the first radar system corresponding to more than one radar component of the second radar system. The radar transmission configuration information or radar reception interference information may comprise at least one of:

different mounting locations on the second vehicle of a radar component of the second radar system, different polarization types of the radar component of the second radar system, different waveforms used for radar transmissions by the radar component of the second radar system, and/or different supported levels of maximum transmission power of the radar component of the second radar system.

In some embodiments, the radar transmission configuration information or radar reception interference information may be communicated by multiple sets of DCI or SCI, including at least one of:

different sets of DCI or SCI are distinguished with different synchronization signals (SS), radio network temporary identifiers, or other control information formats, wherein each of the formats corresponds to different radar components of the second radar system, different sets of DCI or SCI are carried by a different one of a physical downlink control channel (PDCCH), a physical downlink shared channel (PDSCH), a physical sidelink control channel (PSCCH), or a physical sidelink shared channel (PSSCH), and/or different sets of DCI or SCI specify semi-persistent radar signal transmission parameters for the first radar system of the first vehicle to use until a next set of DCI or SCI is received.

In some embodiments, the radar transmission configuration information or radar reception interference information may include radar transmission configuration information that is part of a group common communication to a group of UEs in a group of vehicles that includes the UE 130. A field within the group common communication may correspond to a particular UE within the group of UEs and identify radar signal transmission parameters to use for managing a radar system of a corresponding vehicle within the group of vehicles. Additionally, the group common communication may include a common field that identifies radar signal transmission parameters to use for managing all radar systems in the group of vehicles.

In some embodiments, the radar transmission configuration information or radar reception interference information may include radar reception interference information comprising radar reception parameters configured to enable a radar coupled to the UE 130 to mitigate radar reception interference from radar signals from a radar system of another vehicle, including at least one of a location of the other vehicle's UE or radar signal parameters of the other vehicle's UE.

By way of a non-limiting example, means for implementing the machine-readable instructions 436 of the radar transmission configuration information or radar reception interference information determination module 450 may include a processor (e.g., 210, 212, 214, 216, 218, 252, 260, 131, 141) of a processing device (e.g., 130, 140) may use the memory 133, 143, external resources 420, and/or one or more sensor(s) (e.g., station radar system 454).

The wireless communication control message transmitting module 452 may be configured to transmit, to the UE 130 of the vehicle, a wireless communication control message including the determined radar transmission configuration information or radar reception interference information. By way of non-limiting example, means for implementing the machine-readable instructions 436 of the wireless communication control message transmitting module 452 may include a processor (e.g., 210, 212, 214, 216, 218, 252, 260, 131, 141) of a processing device (e.g., 130, 140) may use the memory 133, 143, external resources 420, and/or one or more sensor(s) (e.g., station radar system 454).

The UE 130 may include one or more processors configured to execute computer program modules similar to those in the machine-readable instructions 436 of the base station control unit 140 described above. Similarly, a given base station control unit 140 may include one or more processors configured to execute computer program modules similar to those in the machine-readable instructions 435 of the UE 130 described above.

The processor(s) 131, 141 may be configured to execute modules 440, 442, 450, and/or 452, and/or other modules. Processor(s) 131, 141 may be configured to execute modules 440, 442, 450, and/or 452, and/or other modules by software; hardware; firmware; some combination of software, hardware, and/or firmware; and/or other mechanisms for configuring processing capabilities on processor(s) 131, 141. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 440, 442, 450, and/or 452 described below is for illustrative purposes, and is not intended to be limiting, as any of modules 440, 442, 450, and/or 452 may provide more or less functionality than is described. For example, one or more of modules 440, 442, 450, and/or 452 may be eliminated, and some or all of its functionality may be provided by other ones of modules 440, 442, 450, and/or 452. As another example, processor(s) 131, 141 may be configured to execute one or more additional modules that may perform some or all of the functionality attributed below to one of modules 440, 442, 450, and/or 452.

FIG. 5 illustrates operations of a method 500 for radar interference management executed by a processor of a UE in accordance with various embodiments. In some embodiments, method 500 may be accomplished with one or more additional operations not described, and/or without one or more of the operations discussed. With reference to FIGS. 1A-5, the operations of the method 500 may be implemented in one or more processors (e.g., a digital processor, an analog processor, a digital circuit designed to process information, an analog circuit designed to process information, a state machine, and/or other mechanisms for electronically processing information) in response to instructions stored electronically on an electronic storage medium of a UE. The one or more processors may include one or more devices configured through hardware, firmware, and/or software to be specifically designed for execution of one or more of the operations of the method 500. For example, the operations of the method 500 may be performed by a processor (e.g., 210, 212, 214, 216, 218, 252, 260, 131, 141) of a UE (e.g., 130).

In block 521, the processor of a UE may perform operations including receiving, at the first UE from a base station, a wireless communication control message including radar transmission configuration information or radar reception interference information regarding the radar signals from a second radar system of a second vehicle having a second UE. In block 521, the processor of the UE may use the wireless communication control message receiving module (e.g., 440). For example, the processor may receive one or more of the wireless communication control messages described above. In some embodiments, means for performing the operations of block 521 may include a processor (e.g., 210, 212, 214, 216, 218, 252, 260, 131, 141) of a processing device (e.g., 130, 140) that may use the memory 133, 143, external resources 420, and/or the radio module 135.

In some embodiments, the wireless communication control message received in block 521 may be or include one of an RRC message, MAC-CE, DCI, or SCI.

In some embodiments, the wireless communication control message received in block 521 may be DCI or SCI messages that are carried by one of a PDCCH, PDSCH, PSCCH, or a PSSCH.

In some embodiments, the wireless communication control message received in block 521 may include radar transmission configuration information and include a modified radar transmission configuration for use in operating the first radar system to avoid interference with the radar signals from the second radar system of the second vehicle.

In some embodiments, the wireless communication control message received in block 521 may include radar transmission configuration information comprising a modified radar transmission configuration for use in operating the first radar system to avoid interference with the radar signals from the second radar system of the second vehicle.

In some embodiments, the wireless communication control message received in block 521 may include radar transmission configuration information for use in operating the first radar system including at least one of time or frequency resource, waveform, duty-cycle, or starting-point, transmission power, space, time, or frequency pre-coding information, or beam sweeping pattern.

In some embodiments, the wireless communication control message received in block 521 may include an indication that the first vehicle should immediately terminate radar transmissions.

In some embodiments, the wireless communication control message received in block 521 may be one of a DCI or a SCI that includes radar transmission configuration information for use in processing signals received by the first radar system corresponding to more than one radar component of the second radar system. The radar transmission configuration information or radar reception interference information may comprise at least one of: different mounting locations on the second vehicle of a radar component of the second radar system; different polarization types of the radar component of the second radar system; different waveforms used for radar transmissions by the radar component of the second radar system; and/or different supported levels of maximum transmission power of the radar component of the second radar system.

In some embodiments, the wireless communication control message received in block 521 may be communicated by multiple sets of DCI or SCI including at least one of: different sets of DCI or SCI are distinguished with different synchronization signals (SS), radio network temporary identifiers, or other control information formats, in which each of the formats corresponds to different radar components of the second radar system; different sets of DCI or SCI are carried by a different one of a physical downlink control channel (PDCCH), a physical downlink shared channel (PDSCH), a physical sidelink control channel (PSCCH), or a physical sidelink shared channel (PSSCH); and/or different sets of DCI or SCI specify semi-persistent radar signal transmission parameters for the first radar system of the first vehicle to use until a next set of DCI or SCI is received.

In some embodiments, the wireless communication control message received in block 521 may include radar transmission configuration information that is part of a group common downlink control information (GC-DCI) to a group of UEs in a group of vehicles that includes the first UE. A field within the GC-DCI may correspond to a particular UE within the group of UEs and identifies radar signal transmission parameters to use for managing a radar system of a corresponding vehicle within the group of vehicles. In some embodiments, the GC-DCI may include a common field that identifies radar signal transmission parameters to use for managing all radar systems in the group of vehicles.

In some embodiments, the wireless communication control message received in block 521 may include radar reception interference information that includes radar reception parameters configured to enable a radar coupled to the first UE to mitigate radar reception interference from radar signals from the second radar system of the second vehicle, including at least one of a location of the second vehicle or radar signal parameters of the second radar system.

In block 523, the processor of a UE may perform operations including using the radar transmission configuration information or radar reception interference information received from the base station to manage operation of the first radar system. In block 523, the processor of the user equipment may use the radar transmission configuration information or radar reception interference information use module (e.g., 442). In some embodiments, means for performing the operations of block 523 may include a processor (e.g., 210, 212, 214, 216, 218, 252, 260, 131, 141) of a processing device (e.g., 130, 140) that may use the memory 133, 143, external resources 420, and/or one or more sensor(s) (e.g., vehicle radar system 444).

In some embodiments, the wireless communication control message may be one of a DCI or a SCI, and in block 523, the processor may suspend radar transmissions in response to not receiving a DCI or SCI in block 521 until a next DCI or SCI is received in block 521.

In some embodiments, the processor may repeat any or all of the operations in blocks 521 and 523 to repeatedly or continuously to perform radar interference management.

Figure 6A:
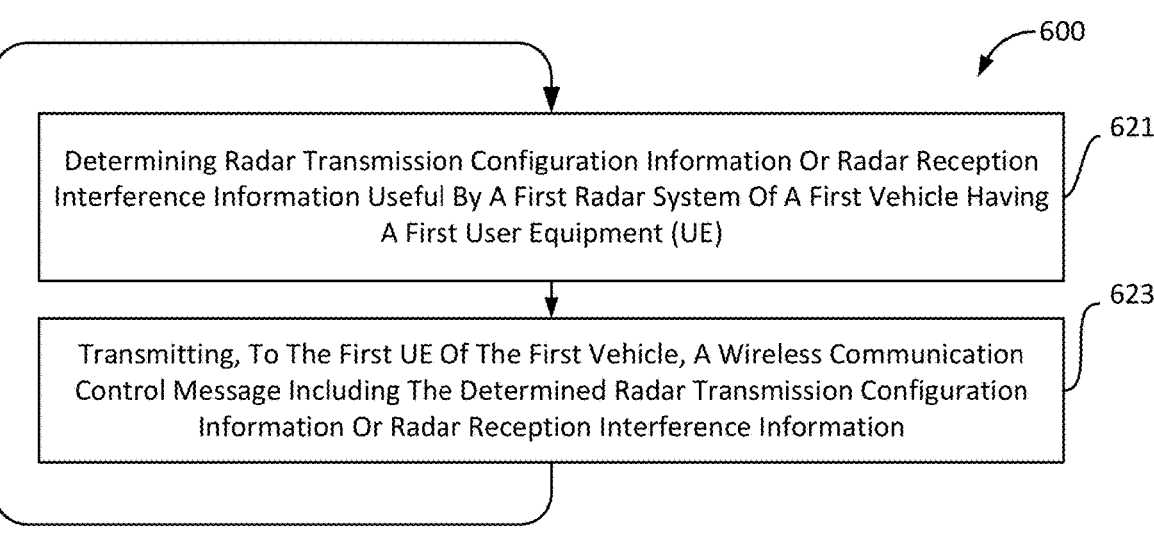
FIGS. 6A and 6B are process flow diagrams of methods for vehicle radar interference management executed by a processor of a base station according to various embodiments.
Figure 6B:
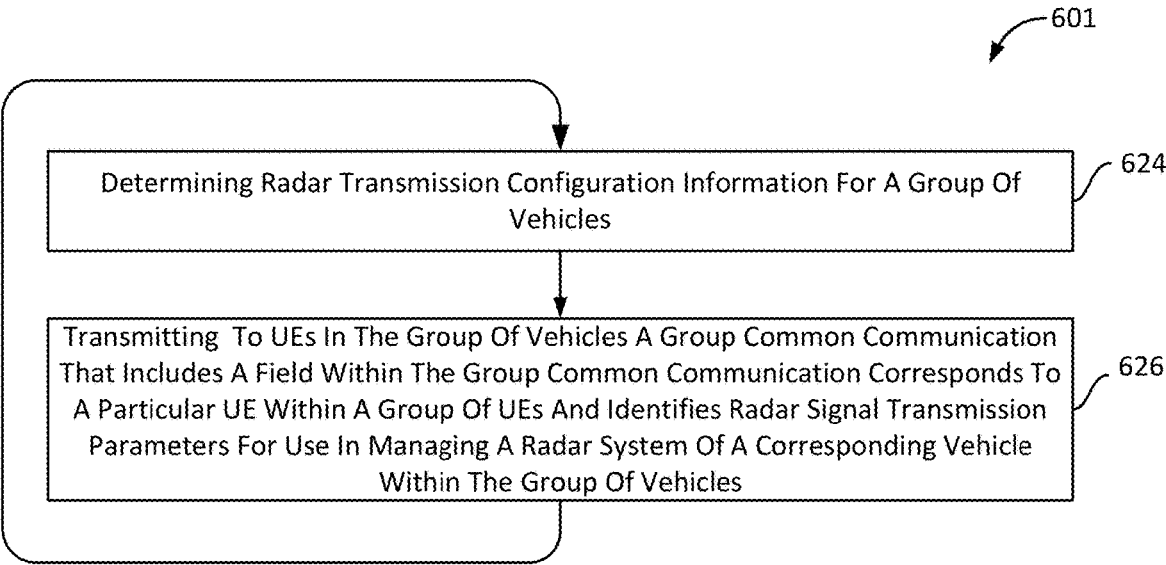

In FIGS. 6A and 6B illustrate operations of methods 600 and 601 for radar interference management executed by a processor of a base station UE in accordance with various embodiments. In some embodiments, method 600 may be accomplished with one or more additional operations not described, and/or without one or more of the operations discussed. With reference to FIGS. 1A-6A, 6B, 6C, may be implemented in one or more processors of a base station (e.g., a digital processor, an analog processor, a digital circuit designed to process information, an analog circuit designed to process information, a state machine, and/or other mechanisms for electronically processing information) in response to instructions stored electronically on an electronic storage medium. For example, with reference to FIGS. 1A-6A, 6B, 6C, the operations of the methods 600, 601 may be performed by a processor (e.g., 210, 212, 214, 216, 218, 252, 260, 131, 141) of a base station (e.g., 140).

Referring to FIG. 6A, in block 621, the processor of a base station may perform operations including determining radar transmission configuration information or radar reception interference information useful by a first radar system of a first vehicle having a first UE. In block 621, the processor of the base station may use the radar transmission configuration information or radar reception interference information determination module (e.g., 450). In some embodiments, means for performing the operations of block 621 may include a processor (e.g., 210, 212, 214, 216, 218, 252, 260, 131, 141) of a processing device (e.g., 130, 140) that may use the memory 133, 143, external resources 420, and/or the station radar system (e.g., 454).

In some embodiments, the processor of a base station may determine radar reception interference information that includes radar reception parameters configured to enable the first radar system to mitigate radar reception interference from radar signals from a second radar system of a second vehicle, including at least one of a location of the second vehicle or radar signal parameters of the second radar system.

In some embodiments, the processor of a base station may determine radar transmission configuration information for use in operating the first radar system including at least one of time or frequency resource, waveform, duty-cycle, or starting-point, transmission power, space, time, or frequency pre-coding information, or beam sweeping pattern.

In some embodiments, the processor of a base station may determine that that the radar system associated with a particular vehicle should cease radar transmissions for some reason and generate radar reception interference information in the form of an indication that the first vehicle should immediately terminate radar transmissions.

In some embodiments, the processor of a base station may determine radar transmission configuration information for use in processing signals received by the first radar system corresponding to more than one radar component of the second radar system of a second vehicle. In such embodiments, the processor may determine at least one of: different mounting locations on the second vehicle of a radar component of the second radar system; different polarization types of the radar component of the second radar system; different waveforms used for radar transmissions by the radar component of the second radar system; and/or different supported levels of maximum transmission power of the radar component of the second radar system.

In some embodiments, the processor of a base station may determine radar reception interference information comprising radar reception parameters configured to enable the first radar system to mitigate radar reception interference from radar signals from a second radar system of a second vehicle, including at least one of a location of the second vehicle or radar signal parameters of the second radar system.

In block 623, the processor of a base station may perform operations including transmitting, to the first UE of the first vehicle, a wireless communication control message including the determined radar transmission configuration information or radar reception interference information. In block 623, the processor of the base station may use the wireless communication control message transmitting module (e.g., 452). In some embodiments, means for performing the operations of block 623 may include a processor (e.g., 210, 212, 214, 216, 218, 252, 260, 131, 141) of a processing device (e.g., 130, 140) that may use the memory 133, 143, external resources 420, and/or the transceiver (e.g., 145).

In some embodiments, the processor of the base station may transmit the wireless communication control message as one of an RRC message, MAC-CE, DCI, or SCI.

In some embodiments, the processor of the base station may transmit a DCI or SCI in one of a PDCCH, PDSCH, PSCCH, and/or PSSCH.

In some embodiments, the processor of the base station may transmit the determined radar transmission configuration information or radar reception interference information in multiple sets of DCI or SCI, including at least one of: different sets of DCI or SCI are distinguished with different synchronization signals (SS), radio network temporary identifiers, or other control information formats, wherein each of the formats corresponds to different radar components of the second radar system; different sets of DCI or SCI are carried by a different one of a physical downlink control channel (PDCCH), a physical downlink shared channel (PDSCH), a physical sidelink control channel (PSCCH), or a physical sidelink shared channel (PSSCH); and/or different sets of DCI or SCI specify semi-persistent radar signal transmission parameters for the first radar system of the first vehicle to use until a next set of DCI or SCI is received.

In some embodiments, the processor may repeat any or all of the operations in blocks 621 and 623 to repeatedly or continuously to perform radar interference management.

FIG. 6B illustrates method 601 that may be performed with or as an enhancement to the method 600 for providing radar transmission configuration information or radar reception interference information to a group of vehicles traveling together.

In block 624, the processor of the base station may perform operations including determining radar transmission configuration information or radar reception interference information for a group of vehicles. As in block 621, the processor may determine the radar transmission configuration information or radar reception interference information for each vehicle in the group (i.e., individually).

In block 626, the processor of the base station may reduce wireless traffic by transmitting the radar transmission configuration information or radar reception interference information determined for each vehicle in the group using a group common control communication that is a single control message that includes a field of information for each UE within the group of vehicle UEs. Each UE-specific field may include radar signal transmission parameters for use in managing a radar system of the corresponding vehicle within the group of vehicles. Similar to the method 600, the processor of the base station control unit may use the radar transmission configuration information or radar reception interference information determination module (e.g., 450) in block 624 and use the wireless communication control message transmission module (e.g., 452) in block 626. In some embodiments, means for performing the operations of block 626 may include a processor (e.g., 210, 212, 214, 216, 218, 252, 260, 131, 141) of a processing device (e.g., 130, 140) that may use the memory 133, 143, external resources 420, the radio module 135, and/or the vehicle radar system 444. Following the operations in block 626, the processor may determine radar transmission configuration information or radar reception interference information useful by a first radar system of a first vehicle having a first UE in block 624.

The processor may repeat the operations in blocks 624, and 626 to repeatedly or continuously to perform radar interference management.

In some embodiments, the processor of the base station may configure the group common control communication to include a common field that identifies radar signal transmission parameters to use for managing all radar systems in the group of vehicles.

Various embodiments may also be useful in applications in which a vehicle radar system does not transmit radar pulses but instead receives radar signals transmitted by a separate and spatially removed transmitter. In a configuration known as bistatic radar, a bistatic radar receiver detects objects around it by receiving and analyzing radar signals that have been transmitted by a bistatic radar transmitter. Unlike ordinary radar in which object detection is accomplished by transmitting a pulse of RF energy and noting the time when reflections of that energy our received, a bistatic radar receiver detects objects by analyzing the signals received while monitoring the RF signals emitted by the dissident transmitter.

Radio waves traveling between the transmitter and the receiver interact with the environment including bouncing off of objects that are in the vicinity between the transmitter and receiver. Thus, the bistatic radar receiver will receive both direct transmission signals (i.e., signals that travel directly between the transmitter and receiver without passing through or reflecting off of objects) as well as signals that have reflected off of objects at some angle to the direct path. Radar signals that are received after reflecting off of an object will arrive later than the direct transmission signals due to the longer path link followed by the radio waves. The path length of reflected and refracted radar signals can be determined by dividing the time interval between reception of the direct path signal and the reflected signal by the speed of light. The approximate location of such objects may then be determined using trigonometry and analysis of the received waveforms. Further information may be obtained by analyzing the received waveform as the process of reflecting and refracting the RF signal may affect the signal that is observed by the bistatic radar receiver. By enabling multiple vehicle radar systems to perform object detection by receiving radar signals transmitted by a single bistatic radar transmitter, bistatic regular technologies provides the advantage of minimizing the amount of radar RF radiation that is transmitted within a given area.

Vehicle radar systems that use bistatic radar technologies may be equipped with a bistatic radar receiver that is configured to detect objects based on processing of radar signals received from a roadside bistatic radar transmitter. For example, bistatic radio transmitters may be positioned at various locations along a roadway enabling motor vehicles to detect objects along the roadway by analyzing the received bistatic radar signals and reflected signals.

Interference with bistatic radar may occur in a mixed deployment in which some vehicles are equipped with ordinary radars and some vehicles are equipped with bistatic radar receivers. Such interference may occur when the vehicle bistatic radar receiver receives and processes both bistatic radar signals and the direct radar pulses of vehicles equipped with ordinary radars. The transmitted pulses of ordinary radars may be powerful because such radars need to detect objects that are not very reflective of RF energy (e.g., people, trees, concrete barriers, etc.), thus requiring the pulses to be transmitted at high enough energy that reflected signals can be distinguished from background RF noise. Thus, conventional radar pulses may carry great distances and will generate a large signal on bistatic radar receivers that are within the transmitted beam.

This is illustrated in FIG. 7A, which shows a situation in which a first vehicle 110a equipped with a bistatic radar receiver is attempting to distinguish objects (e.g., people 5) ahead of the vehicle based on analyzing the signals received resulting from the bistatic radar transmissions 710 from a distant bistatic radar transmitter (i.e., the base station 105) while the first vehicle 110a is being illuminated by the radar pulses that may cause interference 720 of a conventional radar from a second vehicle 110b. In a mixed deployment, such interference will be difficult if impossible to avoid.

Some embodiments may leverage the infrastructure and communication methods of described herein, as well as the technologies of listen-before-talk used in some 5G applications to enable the bistatic radar transmitter to generate radar signals that can compensate for interference that may be received by bistatic radar receivers within the vicinity. Various methods may be used by the bistatic radar transmitter to generate radar signals that can be received and provide useful information despite the presence of direct radar interference, provided that accurate information about the characteristics (e.g., RF frequency, waveform, polarity, signal pattern, pulse rate, etc.) and received power level are known. These embodiments use the concepts of listenbefore-talk and listen-before-reply to provide that information to the bistatic radar transmitter. In particular, the listen-before-talk concepts may be used by the bistatic radar transmitter and the vehicle bistatic radar receivers to provide direct measurements of radar signals by a vehicle's bistatic radar receiver to the device static radar transmitter so that such information can be used to adjust and/or time the transmission of direct radar signals so that vehicle radar systems can detect objects despite or in the presence of such interference.

As illustrated in FIG. 7B and FIG. 7C, the bistatic radar transmitter emits a listen-before-talk (LBT in the figures) trigger signal 730 that bistatic radar receivers are configured to detect. This trigger signal indicates to bistatic radar receivers that the receiver should monitor received RF signals during a listen-before-reply (LBR) interval 730 to measure the RF environment and particularly the reception of RF signals that would interfere with processing of received bistatic radar signals (such as direct radar pulses 760 from the second vehicle 110b), and report information characterizing the received were detected interfering RF signals to the bistatic radar transmitter in a LBR feedback message 740 that is transmitted at a fixed time (e.g., the LBR interval shown in FIG. 7C) following the trigger signal. This trigger-monitor-report sequence thus enables the vehicle bistatic radar receiver to provide the bistatic radar transmitter with the information it needs to adjust the transmitted radar signals. Following reception in processing of the interference information messages from one or more vehicle radar systems, the bistatic radar transmitter may transmit a continuous wave or pulses of radar signals 750 that the vehicle bistatic radar receivers can receive and process for object detection purposes.

In some deployments, the bistatic radar transmitter may be co-located with and/or include the functionality of a base station that performs the signaling operations (i.e., transmit listen-before-talk triggers and receive interference information messages). Thus, in such deployments the base station and transmitter may be the same device or system. In other deployments, the bistatic radar transmitters may be positioned at various locations optimized for radar purposes while base stations along the roadway provide the signaling operations (i.e., transmit listen-before-talk triggers and receive interference information messages) and pass interference information as well as radar transmission timing to the appropriate bistatic radar transmitter (i.e., the transmitter that is positioned to direct radar signals towards the vehicle radar system that transmitted a given interference information message).

The timing and sequence of the listen-before-talk trigger, the duration of monitoring for interfering RF signals, the timing of transmission of the interference information in the listen-before-reply messages in the timing of the bistatic radar signal transmissions may all be defined via protocol and information messages that may be transmitted via control messages, such as RRI, MAC-CE, DCI, SCI, etc. over wireless communication control channels (e.g., PDCCH, PDSCH, PSCCH, or PSSCH) as described above. Control channel signaling may be highly beneficial for coordinating the timing of the various operations involved in bistatic radar systems for moving vehicles. Given the brief time intervals between bistatic radar transmissions required for effective location of objects in front of speeding vehicles, precise timing is required for ensuring bistatic radar receivers monitor for interfering RF signals and transmit the interference information in time to permit direct radar signals to be adjusted in transmitted while bistatic radar receivers are configured to monitor and process the such signals. The low latency and brief signal structure of wireless communication control signals fit the need for communicating the information required for the trigger and interference information messages as well as coordinating the timing of such events.

FIGS. 8A and/or 8B illustrate(s) operations of methods 800 and/or 801 for radar interference management executed by a processor of a UE in accordance with various embodiments. With reference to FIGS. 1A-8A and/or 8B, the operations of the methods 800 and/or 801 presented below are intended to be illustrative. In some embodiments, methods 800 and/or 801 may be accomplished with one or more additional operations not described, and/or without one or more of the operations discussed.

In some embodiments, the methods 800 and/or 801 may be implemented in one or more processors (e.g., a digital processor, an analog processor, a digital circuit designed to process information, an analog circuit designed to process information, a state machine, and/or other mechanisms for electronically processing information) in response to instructions stored electronically on an electronic storage medium of a UE. The one or more processors may include one or more devices configured through hardware, firmware, and/or software to be specifically designed for execution of one or more of the operations of the methods 800 and/or 801. For example, with reference to FIGS. 1A-8A and/or 8B, the operations of the methods 800 and/or 801 may be performed by a processor (e.g., 210, 212, 214, 216, 218, 252, 260, 131, 141) of a UE (e.g., 130).

FIG. 8A illustrates the method 800, in accordance with one or more implementations.

In block 821, the processor of a UE may perform operations including receiving, from a base station, a listen-before-talk trigger before a bistatic radar transmission. In block 821, the processor of the user equipment may use the radio module (e.g., 135). For example, the processor may receive one or more of the wireless communication control messages described above. In some embodiments, means for performing the operations of block 821 may include a processor (e.g., 210, 212, 214, 216, 218, 252, 260, 131, 141) of a processing device (e.g., 130, 140) that may use the memory 133, 143, external resources 420, and/or the radio module 135.

In block 823, the processor of a UE may perform operations including directing the bistatic radar receiver to monitor for radar interference signals for a listening interval. In block 823, the processor of the user equipment may use the vehicle radar system (e.g., 444). In some embodiments, means for performing the operations of block 823 may include a processor (e.g., 210, 212, 214, 216, 218, 252, 260, 131, 141) of a processing device (e.g., 130, 140) that may use the memory 133, 143, external resources 420, and/or one or more sensor(s) (e.g., vehicle radar system 444).

In block 825, the processor of a UE may perform operations including transmitting, to the base station, radar signal interference information detected during the listening interval. In block 825, the processor of the user equipment may use the radio module (e.g., 135). In some embodiments, means for performing the operations of block 825 may include a processor (e.g., 210, 212, 214, 216, 218, 252, 260, 131, 141) of a processing device (e.g., 130, 140) that may use the memory 133, 143, external resources 420, and/or the radio module 135).

In block 827, the processor of a UE may perform operations including directing the bistatic radar receiver to receive and process bistatic radar signals following transmission of the radar signal interference information. In block 827, the processor of the user equipment may use the radio module (e.g., 135 and/or the vehicle radar system (e.g., 444). In some embodiments, means for performing the operations of block 827 may include a processor (e.g., 210, 212, 214, 216, 218, 252, 260, 131, 141) of a processing device (e.g., 130, 140) that may use the memory 133, 143, external resources 420, the radio module 135, and/or one or more sensor(s) (e.g., vehicle radar system 444).

In some embodiments, the processor may repeat any or all of the operations in blocks 821, 823, 825, and 827 to repeatedly or continuously to perform radar interference management.

FIG. 8B illustrates method 801 that may be performed with or as an enhancement to the method 500.

In block 828, the processor of the UE may perform operations, following the operations in block 821 of the method 800, such that the received listen-before-talk trigger provides at least one of (a) a duration that the directing of the bistatic radar receiver should monitor for radar interference; or (b) time to transmit the radar signal interference information to the base station. In block 828, the processor of the user equipment may use may use the radio module (e.g., 135). In some embodiments, means for performing the operations of block 523 may include a processor (e.g., 210, 212, 214, 216, 218, 252, 260, 131, 141) of a processing device (e.g., 130, 140) that may use the memory 133, 143, external resources 420, and/or the radio module 135. Following the operations in block 828, the processor may direct the bistatic radar receiver to monitor for radar interference signals for a listening interval in block 823.

In some embodiments, the processor may repeat any or all of the operations in blocks 821, 823, 825, 827, and 828 to repeatedly or continuously to perform radar interference management.

Figure 9:
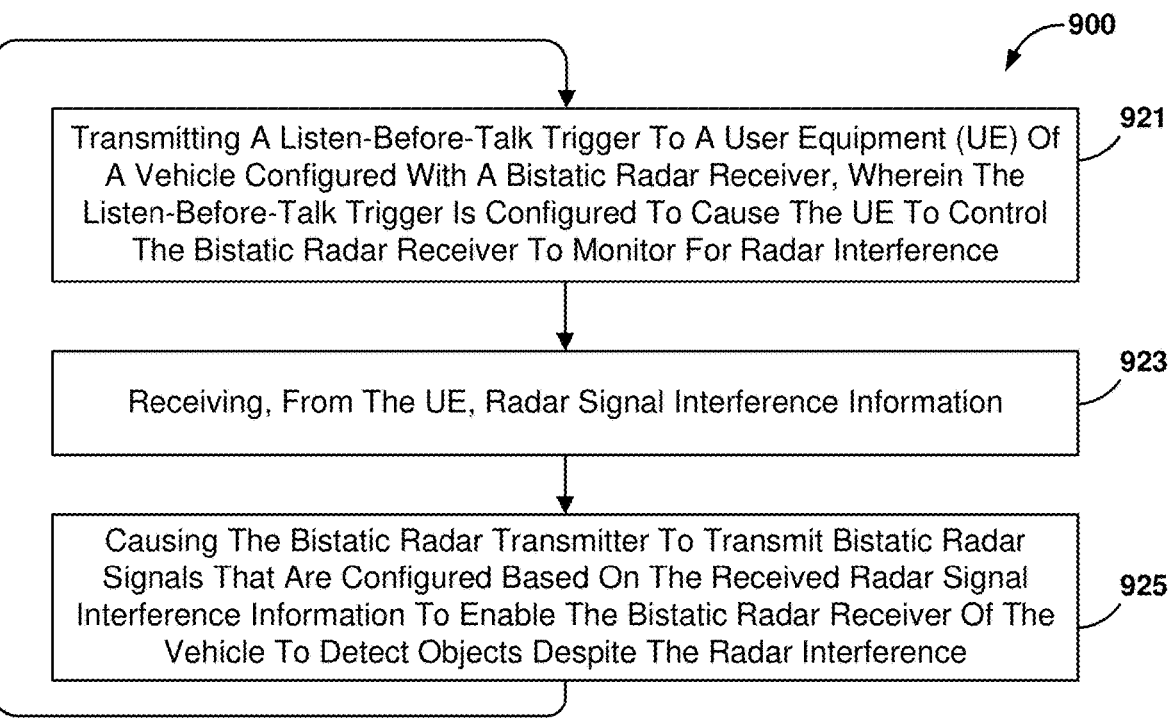
FIG. 9 is a process flow diagram of an example method for vehicle radar interference management using bistatic radar, executed by a processor of a computing device according to various embodiments.

FIG. 9, illustrates operations of a method 900 for radar interference management executed by a processor of a UE in accordance with various embodiments. With reference to FIGS. 1A-9, the operations of the method 900 presented below are intended to be illustrative. In some embodiments, method 900 may be accomplished with one or more additional operations not described, and/or without one or more of the operations discussed.

In some embodiments, the method 900 may be implemented in one or more processors (e.g., a digital processor, an analog processor, a digital circuit designed to process information, an analog circuit designed to process information, a state machine, and/or other mechanisms for electronically processing information) in response to instructions stored electronically on an electronic storage medium of a base station. The one or more processors may include one or more devices configured through hardware, firmware, and/or software to be specifically designed for execution of one or more of the operations of the method 900. For example, with reference to FIGS. 1A-9, the operations of the method 900 may be performed by a processor (e.g., 210, 212, 214, 216, 218, 252, 260, 131, 141) of a base station control unit (e.g., 140).

In block 921, the processor of a base station control unit may perform operations including transmit a listen-before-talk trigger to a UE of a vehicle configured with a bistatic radar receiver, wherein the listen-before-talk trigger is configured to cause the UE to control the bistatic radar receiver to monitor for radar interference. In block 921, the processor of the base station control unit may use the wireless communication control message transmitting module (e.g., 452). In some embodiments, means for performing the operations of block 621 may include a processor (e.g., 210, 212, 214, 216, 218, 252, 260, 131, 141) of a processing device (e.g., 130, 140) that may use the memory 133, 143, external resources 420, and/or the transceiver (e.g., 145).

In block 923, the processor of a base station control unit may perform operations including receive, from the UE, radar signal interference information. In block 923, the processor of the base station control unit may use transceiver (e.g., 145). In some embodiments, means for performing the operations of block 923 may include a processor (e.g., 210, 212, 214, 216, 218, 252, 260, 131, 141) of a processing device (e.g., 130, 140) that may use the memory 133, 143, external resources 420, and/or the transceiver (e.g., 145).

In block 925, the processor of a base station control unit may perform operations including cause the bistatic radar transmitter to transmit bistatic radar signals that are configured based on the received radar signal interference information to enable the bistatic radar receiver of the vehicle to detect objects despite the radar interference. In block 923, the processor of the base station control unit may use transceiver (e.g., 145) and/or the station radar system 454. In some embodiments, means for performing the operations of block 923 may include a processor (e.g., 210, 212, 214, 216, 218, 252, 260, 131, 141) of a processing device (e.g., 130, 140) that may use the memory 133, 143, external resources 420, the transceiver (e.g., 145), and/or the station radar system (e.g., 454).

In some embodiments, the processor may repeat any or all of the operations in blocks 921, 923, and 925 to repeatedly or continuously to perform radar interference management.

Figure 10:
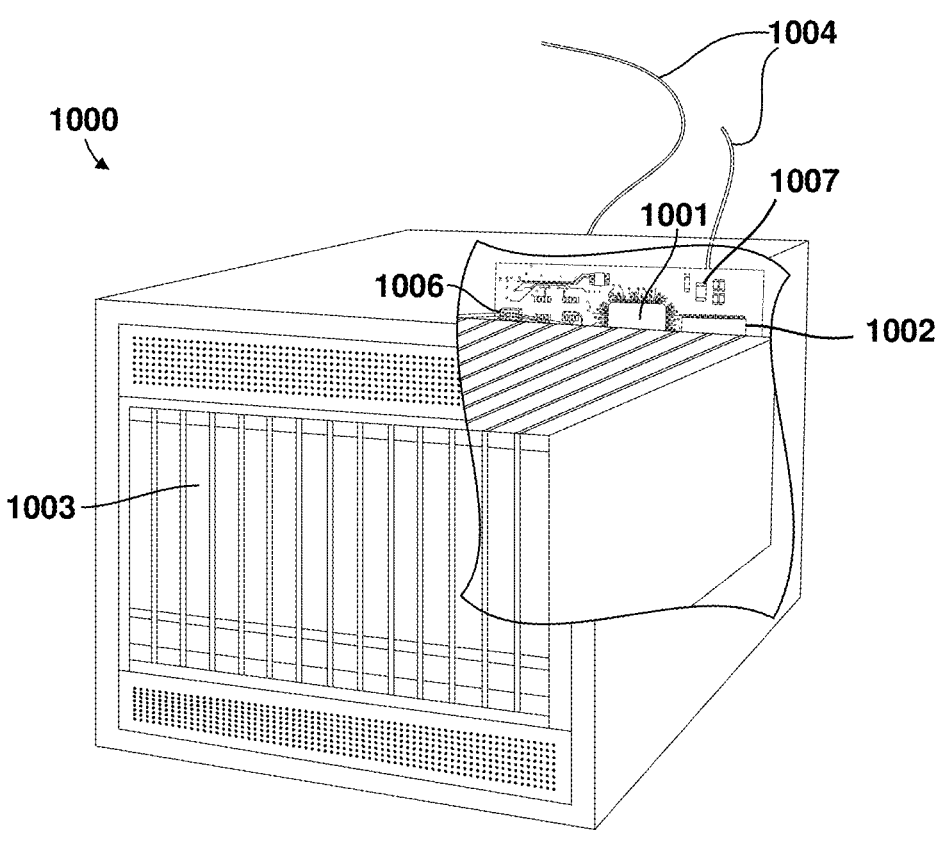
FIG. 10 is a component block diagram of a base station server computing device suitable for use with various embodiments.

Various embodiments (including, but not limited to, embodiments discussed above with reference to FIGS. 1A-9) may be implemented on a variety of remote computing devices, an example of which is illustrated in FIG. 10 in the form of a base station server. With reference to FIGS. 1A-10, the base station server 1000 may include a processor 1001 coupled to volatile memory 1002 and a large capacity nonvolatile memory, such as a disk drive 1003. The base station server 1000 may also include a peripheral memory access device such as a floppy disc drive, compact disc (CD) or digital video disc (DVD) drive 1006 coupled to the processor 1001. The base station server 1000 may also include network access ports 1004 (or interfaces) coupled to the processor 1001 for establishing data connections with a network, such as the Internet and/or a local area network coupled to other system computers and servers. The base station server 1000 may include one or more antennas 1007 for sending and receiving electromagnetic radiation that may be connected to a wireless communication link. The base station server 1000 may include additional access ports, such as USB, Firewire, Thunderbolt, and the like for coupling to peripherals, external memory, or other devices.

Figure 11:
FIG. 11 is a component block diagram of user equipment suitable for use with various embodiments.

The various aspects (including, but not limited to, embodiments discussed above with reference to FIGS. 1A-9) may be implemented on a variety of UE system, an example of which is illustrated in FIG. 11 in the form of a computing device suitable for use in a vehicle. With reference to FIGS. 1A-11, the UE 1100 may include a first SoC 202 (e.g., a SoC-CPU) coupled to a second SoC 204 (e.g., a 5G capable SoC) and a third SoC 1106 (e.g., a C-V2X SoC configured for managing V2V, V2I, and V2P communications over D2D links, such as D2D links establish in the dedicated ITS 5.9 GHz spectrum communications). The first, second, and/or third SoCs 202, 204, and 1106 may be coupled to internal memory 1116 and a radio module 135. Additionally, the UE 1100 may include a radio module 135 (e.g., a wireless data link and/or cellular transceiver, etc.)

coupled to one or more processors in the first, second, and/or third SoCs 202, 204, and 1106. The radio module 135 may be connected to an antenna interface 1104 for connecting to a vehicle antenna for sending and receiving electromagnetic radiation.

The processors implementing various embodiments may be any programmable microprocessor, microcomputer or multiple processor chip or chips that can be configured by software instructions (applications) to perform a variety of functions, including the functions of the various aspects described in this application. In some communication devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a processor of a communication device and the communication device may be referred to as a component. One or more components may reside within a process and/or thread of execution and a component may be localized on one processor or core and/or distributed between two or more processors or cores. In addition, these components may execute from various non-transitory computer-readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various aspects. Such services and standards may include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), EDGE, advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iden), C-V2X, V2V, V2P, V2I, and V2N, etc. Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or non-transitory processor-readable storage medium. The operations of a method or algorithm disclosed herein may be embodied in a processor-executable software module or processor-executable instructions, which may reside on a non-transitory computer-readable or processor-readable storage medium.

Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method executed by a processor of a first user equipment (UE) of a first vehicle having a first radar system, comprising:

receiving, at the first UE from a base station, a wireless communication control message including radar transmission configuration information or radar reception interference information regarding radar signals from a second radar system of a second vehicle having a second UE, wherein the wireless communication control message comprises one of a radio resource control (RRC) message, a medium access control-control element (MAC-CE), a downlink control information (DCI), or a sidelink control information (SCI), wherein the DCI or the SCI is carried by one of a physical downlink control channel (PDCCH), a physical downlink shared channel (PDSCH), a physical sidelink control channel (PSCCH), or a physical sidelink shared channel (PSSCH); and using the radar transmission configuration information or the radar reception interference information received from the base station to manage operation of the first radar system.

2. The method of claim 1, wherein the wireless communication control message includes the radar transmission configuration information comprising:

a modified radar transmission configuration for use in operating the first radar system to avoid interference with the radar signals from the second radar system of the second vehicle.

3. The method of claim 1, wherein the wireless communication control message includes the radar transmission configuration information for use in operating the first radar system including at least one of:

time or frequency resource;

waveform, duty-cycle, or starting-point;

transmission power;

space, time, or frequency pre-coding information; or beam sweeping pattern.

4. The method of claim 1, wherein the wireless communication control message includes an indication that the first vehicle should immediately terminate radar transmissions.

5. The method of claim 1, wherein the wireless communication control message is one of the DCI or the SCI that includes the radar transmission configuration information for use in managing radar transmissions by the first radar system comprising multiple radar components, in which the multiple radar components are:

mounted on different locations of the second vehicle of a radar component;

transmitting with different polarization types;

transmitting different waveforms used for radar transmissions by the radar component of the second radar system; or transmitting at different transmit power levels.

6. The method of claim 5, wherein the wireless communication control message is communicated by multiple sets of RRC-configurations or MAC-CE messages or the DCI or the SCI including at least one of:

different sets of DCI or SCI are distinguished with formats including different synchronization signals (SS), radio network temporary identifiers, or other control information formats, wherein each of the formats corresponds to different radar components of the second radar system;

different sets of DCI or SCI are carried by a different one of a PDCCH, a PDSCH, a PSCCH, or a PSSCH; or different sets of DCI or SCI specify semi-persistent radar signal transmission parameters for the first radar system of the first vehicle to use until a next set of DCI or SCI is received.

7. The method of claim 6, where the multiple sets of RRC-configurations or MAC-CE messages or the DCI or the SCI are respectively associated with different radar components that are at least one of:

mounted on different locations of the second vehicle of a radar component;

transmitting with different polarization types;

transmitting different waveforms used for radar transmissions by the radar component of the second radar system; or transmitting at different transmit power levels.

8. The method of claim 1, wherein the wireless communication control message is one of the DCI or the SCI that includes the radar reception interference information for use in processing signals received by the first radar system corresponding to more than one radar component of the second radar system comprising at least one of:

different mounting locations on the second vehicle of a radar component of the second radar system;

different polarization types of the radar component of the second radar system;

different waveforms used for radar transmissions by the radar component of the second radar system; or different supported levels of maximum transmission power of the radar component of the second radar system.

9. The method of claim 8, wherein the wireless communication control message is communicated by multiple sets of DCI or SCI including at least one of:

different sets of DCI or SCI are distinguished with formats including different synchronization signals (SS), radio network temporary identifiers, or other control information formats, wherein each of the formats corresponds to different radar components of the second radar system;

different sets of DCI or SCI are carried by a different one of a PDCCH, a PDSCH, a physical PSCCH, or a PSSCH; or different sets of DCI or SCI specify semi-persistent radar signal transmission parameters for the first radar system of the first vehicle to use until a next set of DCI or SCI is received.

10. The method of claim 1, wherein:

the wireless communication control message is one of the DCI or the SCI; and using the radar transmission configuration information or the radar reception interference information received from the base station to manage operation of the first radar system comprises suspending radar transmissions in response to not receiving the DCI or the SCI until a next DCI or SCI is received.

11. The method of claim 1, wherein the wireless communication control message includes the radar transmission configuration information that is part of a group common downlink control information (GC-DCI) to a group of UEs in a group of vehicles that includes the first UE, wherein a field within the GC-DCI corresponds to a particular UE within the group of UEs and identifies radar signal transmission parameters to use for managing a radar system of a corresponding vehicle within the group of vehicles.

12. The method of claim 11, wherein the GC-DCI includes a common field that identifies radar signal transmission parameters to use for managing all radar systems in the group of vehicles.

13. The method of claim 1, wherein the wireless communication control message includes the radar reception interference information comprising:

radar reception parameters configured to enable a radar coupled to the first UE to mitigate radar reception interference from the radar signals from the second radar system of the second vehicle, including at least one of a location of the second vehicle or radar signal parameters of the second radar system.

14. A user equipment (UE) configured for use in a first vehicle equipped with a first radar system, comprising:

a wireless transceiver; and one or more processors coupled to the wireless transceiver and configured with processor-executable instructions to:

receive, from a base station, a wireless communication control message including radar transmission configuration information or radar reception interference information regarding radar signals from a second radar system of a second vehicle, wherein the wireless communication control message comprises one of a radio resource control (RRC) message, a medium access control-control element (MAC-CE), a downlink control information (DCI), or a sidelink control information (SCI), wherein the DCI or the SCI is carried by one of a physical downlink control channel (PDCCH), a physical downlink shared channel (PDSCH), a physical sidelink control channel (PSCCH), or a physical sidelink shared channel (PSSCH); and use the radar transmission configuration information or radar reception interference information received from the base station to manage operation of the first radar system.

15. The UE of claim 14, wherein the wireless communication control message includes the radar transmission configuration information comprising:

a modified radar transmission configuration for use in operating the first radar system to avoid interference with the radar signals from the second radar system of the second vehicle.

16. The UE of claim 14, wherein the wireless communication control message includes the radar transmission configuration information for use in operating the first radar system including at least one of: time or frequency resource; waveform, duty-cycle, or starting-point; transmission power; space, time, or frequency pre-coding information; or beam sweeping pattern.

17. The UE of claim 14, wherein the wireless communication control message includes an indication that the first vehicle should immediately terminate radar transmissions.

18. The UE of claim 14, wherein the wireless communication control message is one of the DCI or the SCI that includes the radar transmission configuration information for use in managing radar transmissions by the first radar system comprising multiple radar components, in which the multiple radar components are:

mounted on different locations of the second vehicle of a radar component;

associated with different polarization types;

associated with different waveforms used for radar transmissions by the radar component of the second radar system; or associated with different transmit power levels.

19. The UE of claim 18, wherein the wireless communication control message is associated with multiple sets of RRC-configurations or MAC-CE messages or the DCI or the SCI including at least one of:

different sets of DCI or SCI are distinguished with formats including different synchronization signals (SS), radio network temporary identifiers, or other control information formats, wherein each of the formats corresponds to different radar components of the second radar system;

different sets of DCI or SCI are carried by a different one of a PDCCH, a PDSCH, a PSCCH, or a PSSCH; or different sets of DCI or SCI specify semi-persistent radar signal transmission parameters for the first radar system of the first vehicle to use until a next set of DCI or SCI is received.

20. The UE of claim 19, where the multiple sets of RRC-configurations or MAC-CE messages or the DCI or the SCI are respectively associated with different radar components that are at least one of:

mounted on different locations of the second vehicle of a radar component;

associated with different polarization types;

associated with different waveforms used for radar transmissions by the radar component of the second radar system; or associated with different transmit power levels.

21. The UE of claim 14, wherein the wireless communication control message is one of the DCI or the SCI that includes radar reception interference information for use in processing signals received by the first radar system corresponding to more than one radar component of the second radar system comprising at least one of:

different mounting locations on the second vehicle of a radar component of the second radar system;

different polarization types of the radar component of the second radar system;

different waveforms for radar transmissions by the radar component of the second radar system; or different supported levels of maximum transmission power of the radar component of the second radar system.

22. The UE of claim 21, wherein the wireless communication control message is associated with multiple sets of the DCI or the SCI including at least one of:

different sets of DCI or SCI are distinguished with formats including different synchronization signals (SS), radio network temporary identifiers, or other control information formats, wherein each of the formats corresponds to different radar components of the second radar system;

different sets of DCI or SCI are associated with a different one of a PDCCH, a PDSCH, a PSCCH, or a PSSCH; or different sets of DCI or SCI specify semi-persistent radar signal transmission parameters for the first radar system of the first vehicle to use until a next set of DCI or SCI is received.

23. The UE of claim 14, wherein:

the wireless communication control message is one of the DCI or the SCI; and the one or more processors are configured with processor-executable instructions such that using the radar transmission configuration information or radar reception interference information to manage operation of the first radar system comprises suspending radar transmissions in response to not receiving the DCI or the SCI until a next DCI or SCI is received.

24. The UE of claim 14, wherein the wireless communication control message includes the radar transmission configuration information that is part of a group common downlink control information (GC-DCI) to a group of UEs in a group of vehicles that includes the UE, wherein a field within the GC-DCI corresponds to a particular UE within the group of UEs and identifies radar signal transmission parameters to use for managing a radar system of a corresponding vehicle within the group of vehicles.

25. The UE of claim 24, wherein the GC-DCI includes a common field that identifies radar signal transmission parameters to use for managing all radar systems in the group of vehicles.

26. The UE of claim 14, wherein the wireless communication control message includes radar reception interference information comprising:

radar reception parameters configured to enable a radar coupled to the UE to mitigate radar reception interference from radar signals from the second radar system of the second vehicle, including at least one of a location of the second vehicle or radar signal parameters of the second radar system.

* * * * *